(12) United States Patent
Agarwal et al.

(10) Patent No.: US 11,836,096 B2
(45) Date of Patent: Dec. 5, 2023

(54) MEMORY-FLOW CONTROL REGISTER

(71) Applicant: Micron Technology, Inc., Boise, ID (US)

(72) Inventors: Nikesh Agarwal, Bangalore (IN); Robert Walker, Raleigh, NC (US); Laurent Isenegger, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 19 days.

(21) Appl. No.: 17/559,320

(22) Filed: Dec. 22, 2021

(65) Prior Publication Data

US 2023/0195659 A1  Jun. 22, 2023

(51) Int. Cl.
*G06F 13/16* (2006.01)
*G06F 13/42* (2006.01)
*G06F 9/30* (2018.01)

(52) U.S. Cl.
CPC ...... *G06F 13/1668* (2013.01); *G06F 9/30101* (2013.01); *G06F 13/1621* (2013.01); *G06F 13/1642* (2013.01); *G06F 13/4221* (2013.01)

(58) Field of Classification Search
CPC ............. G06F 13/1668; G06F 13/1621; G06F 13/1641; G06F 13/4221; G06F 9/30101
USPC ....................................................... 711/154
See application file for complete search history.

(56) References Cited

U.S. PATENT DOCUMENTS

| | | | |
|---|---|---|---|
| 6,531,501 B1* | 3/2003 | Huber ................. | C07D 231/44 548/368.4 |
| 6,877,049 B1* | 4/2005 | Myers ................. | G06F 13/4059 710/52 |
| 7,712,006 B1* | 5/2010 | Miller ................. | G06F 13/4273 714/753 |
| 10,437,758 B1* | 10/2019 | Mathews ............ | G06F 13/18 |
| 10,838,884 B1* | 11/2020 | Magudilu Vijavaraj ..................... G06F 13/1668 |
| 11,379,388 B1* | 7/2022 | Balakrishnan ...... | G06F 13/1642 |
| 2003/0227926 A1* | 12/2003 | Ramamurthy ...... | H04L 12/5601 370/395.42 |
| 2004/0044857 A1* | 3/2004 | Jeddeloh ............. | G06F 13/1673 711/105 |
| 2005/0172084 A1* | 8/2005 | Jeddeloh ............. | G06F 13/1642 711/154 |
| 2012/0226841 A1* | 9/2012 | Nguyen .............. | G06F 13/4059 710/112 |

(Continued)

*Primary Examiner* — Christopher B Shin
(74) *Attorney, Agent, or Firm* — Colby Nipper PLLC

(57) ABSTRACT

Described apparatuses and methods relate to a memory-flow control register for a memory system that may support a nondeterministic protocol. To help manage the flow of memory requests in a system, a memory device can include logic, such as a hardware register, that can store values indicative of a total number of memory requests that are serviceable by the memory device at a time. The logic can be configured by device manufacturers during assembly. The manufacturers can determine the limits or capabilities of the system, based on the components and structures, and publish the capabilities, including QoS, based on the limits. When the memory device is connected to a host, the host can read the values and limit the number of memory requests sent to the device based on the values. Accordingly, the memory-flow control register can improve latency and bandwidth in accessing a memory device over an interconnect.

36 Claims, 7 Drawing Sheets

(56) References Cited

U.S. PATENT DOCUMENTS

| | | | |
|---|---|---|---|
| 2019/0196996 A1* | 6/2019 | Balakrishnan | G06F 13/30 |
| 2020/0050390 A1* | 2/2020 | Bavishi | G06F 3/0613 |
| 2020/0050391 A1* | 2/2020 | Meyerowitz | G06F 3/0685 |
| 2020/0050398 A1* | 2/2020 | Meyerowitz | G11C 5/04 |
| 2020/0171938 A1* | 6/2020 | Ishibashi | G01L 3/109 |
| 2021/0349512 A1* | 11/2021 | Guim Bernat | H04L 12/10 |
| 2021/0374080 A1* | 12/2021 | Horwich | G06F 12/0862 |
| 2023/0067749 A1* | 3/2023 | Srinivasan | G06F 3/0604 |

\* cited by examiner

MEMORY-FLOW CONTROL REGISTER

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random access memory (RAM)) and nonvolatile memory (e.g., flash memory). Like the number of cores or speed of a processor, the rate at which data can be accessed and the delay in accessing it can impact an electronic device's performance.

Further, the demands on memory in electronic devices continue to evolve and grow. For example, as manufacturers engineer processors to execute code faster, processors benefit from accessing data in memories more quickly. Applications on electronic devices may also operate on ever-larger data sets that require ever-larger memories.

BRIEF DESCRIPTION OF THE DRAWINGS

This document describes apparatuses and techniques for operating, or interoperating with, a memory-flow control register with reference to the following drawings. The same numbers are used throughout the drawings to reference like features and components.

DETAILED DESCRIPTION

Overview

Figure 1:
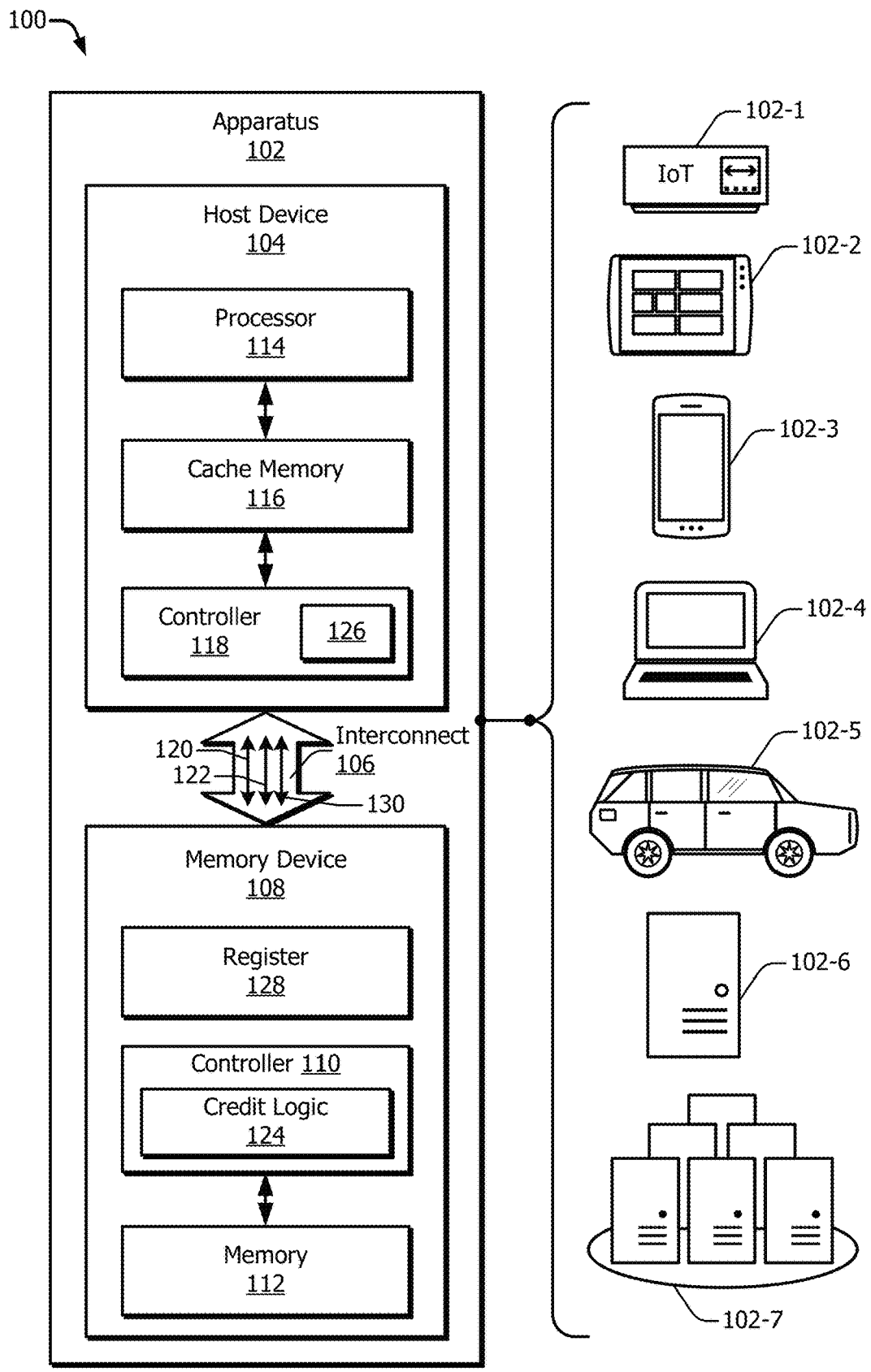
FIG. 1 illustrates example apparatuses that can implement aspects of a memory-flow control register.

Processors work in tandem with memory to provide features on computers and other electronic devices, including smartphones. An electronic device can generally provide enhanced features, such as high-resolution graphics and artificial intelligence, as a processor-and-memory tandem operate faster. Some applications, like those for artificial intelligence and virtual-reality graphics, demand increasing amounts of memory. Advances in processors have often outpaced those in the connections between the processor and memory. Additionally, as the evolution of data- and bandwidth-intensive applications continues, manufacturers seek improved links and mechanisms to improve the bandwidth and latency associated with accessing memory located on connected devices.

Processors and memories can be secured to a printed-circuit board (PCB), such as a motherboard. The PCB can include sockets for accepting at least one processor and one or more memories and various wiring infrastructure that enable communication between two or more components. The PCB, however, offers a finite area for the sockets and the wiring infrastructure. Some PCBs include sockets that are shaped into linear slots and are designed to accept multiple double-inline memory modules (DIMMs). These sockets can be fully occupied by DIMMs while a processor is still able to utilize more memory. In such situations, the system can have improved performance if more memory were available.

Printed circuit boards may also include at least one peripheral component interconnect (PCI) express (PCI Express®) (PCIe) slot. PCIe is designed to provide a common interface for various types of components that may be coupled to a PCB. Compared to some older standards, PCIe can provider higher rates of data transfer or a smaller footprint on the PCB, including both greater speed and smaller size. PCIe links enable interconnection of processors and peripheral memory devices at increased speeds compared to older standards. Accordingly, some PCBs enable a processor to access a memory device that is connected to the PCB via a PCIe slot.

PCIe links, however, may have limitations in an environment with large, shared memory pools and devices that require high bandwidth and low latency. For example, PCIe links do not specify mechanisms to support coherency and often cannot efficiently manage isolated pools of memory. In addition, the latency for PCIe links can be too high to efficiently manage shared memory access across multiple devices within a system. As a result, accessing a memory solely using a PCIe protocol may not offer as much functionality, flexibility, or reliability as is desired.

In such cases, another protocol can be layered on top of the PCIe protocol. An example of another, higher-level protocol is the Compute Express Link (CXL) protocol. The CXL protocol can be implemented over a physical layer that is governed by the PCIe protocol. The CXL protocol targets intensive workloads for processors and memory devices (e.g., accelerators, memory expanders), where efficient, coherent memory access between processors and memory is required. The CXL protocol addresses some of the limitations of PCIe links by providing an interface that leverage the PCIe 5.0 physical layer and electricals, while providing lower latency paths for memory access and coherent caching between processors and memory devices. It offers high-bandwidth, low-latency connectivity between host devices (e.g., processors, CPUs, SoCs) and memory devices (e.g., accelerators, memory expanders, memory buffers, smart input/output (I/O) devices). The CXL protocol also addresses growing high-performance computational workloads by supporting heterogeneous processing and memory systems with potential applications in artificial intelligence, machine learning, communication systems, and other high-performance computing.

Various electronic devices, such as a mobile phone with a system-on-chip (SoC) or a cloud-computing server with dozens of processing units, may employ memory that is coupled to a processor via a CXL-based interconnect (which can be referred to as a "CXL link" in this document). For clarity, consider an apparatus with a host device that is coupled to another device (e.g., a memory expander, or another device, including Type 1, Type 2, and Type 3 CXL devices) via a CXL link. The host device can include a processor and a controller (e.g., a host-side controller) that is coupled to the interconnect. The other device, sometimes referred to in this documents as a memory device, can include another controller (e.g., a memory-side controller) that is coupled to the interconnect and one or more memory arrays to store information in SRAM, DRAM, flash memory, and so forth.

During operation, the host-side controller issues memory requests to the memory-side controller over the interconnect. The memory request may be or include a read request or a write request. The memory-side controller receives the request and directly or indirectly uses the memory arrays to fulfill the memory request with a memory response. Thus, the memory-side controller sends the memory response to the host-side controller via the interconnect. To fulfill a read request, the memory-side controller can return the requested data as the memory response, such as a subordinate-to-master data-response message (e.g., a data response message, such as S2M DRS MemData). If the requested data is not available, the memory-side controller can return a no-data response (NDR) message (e.g., S2M NDR Cmp). To fulfill a write request, the memory-side controller can acknowledge that the write operation was completed as the memory response (e.g. an S2M NDR Cmp message).

To increase bandwidth and reduce latency, the memory-side controller can include at least one request queue that may accumulate multiple memory requests received from the host-side controller. In other words, the host-side controller can send a "subsequent" memory request before receiving a memory response corresponding to a "previous" memory request. This can ensure that the memory device is not waiting idly for another memory request that the host-side controller has already prepared. This technique can also better utilize the interconnect by transmitting the subsequent memory request before the memory response for the previous memory request is ready. The request queue at the memory-side controller may, however, have space for a finite quantity of entries. If the host-side controller overflows the request queue at the memory-side controller, memory accessing can be slowed, and the overflow may even cause data faults. In other words, without a mechanism to control the flow of memory access requests, bandwidth or latency can be degraded, and errors may occur.

One approach to modulating (e.g., moderating) the flow of memory requests involves using credits. The host-side controller can be granted a particular quantity of credits, which maximum credit quantity may be based on a size of the request queue of the memory-side controller. If the host-side controller currently has at least one credit, then the host-side controller can issue a memory request to the memory-side controller over the interconnect. If the host-side controller has depleted the granted supply of credits, the host-side controller waits until at least one credit has been replenished before issuing another memory request.

The memory-side controller can be responsible for replenishing credits. The memory-side controller can indicate to the host-side controller that one or more credits have been replenished or returned using a communication across the interconnect. For example, a memory response that includes read data or a write acknowledgement can also include a credit return indication. In some cases, the memory-side controller returns a credit responsive to a memory request being removed from the request queue at the memory-side controller. This approach to a credit system can prevent the request queue at the memory-side controller from overflowing and causing an error condition.

This approach may not, however, prevent bandwidth from being reduced or latency from increasing due to an oversupply of the total memory requests present in or at the memory device. In addition to the memory-side controller and the memory arrays, the memory device may include other components to facilitate memory request processing. For example, the memory device may include at least one "internal" interconnect and one or more memory controllers, which are coupled to the memory arrays to control access thereto (coupled, for example through an interface). Any of these components may include at least one respective memory request queue. For instance, each memory controller of two memory controllers may include a respective request queue of two request queues.

Responsive to the memory-side controller removing a memory request from its request queue, the memory-side controller forwards the memory request to a "downstream" or "backend" component, such as one of the memory controllers. The receiving memory controller may be accumulating memory requests in its respective request queue. This accumulation may occur, for instance, due to a slower memory array that is unable to process requests at the rate at which the requests are being received from the memory-side controller. Thus, the memory-side controller may return a credit to the host-side controller even though un-serviced memory requests are "piling up" at the memory device.

Permitting the request queues of the memory controllers, or of other backend components, to become saturated can lower the data bandwidth throughput of the memory system. The saturation can also increase the latency between when the memory device accepts a memory request from the host device and when the memory device provides the corresponding memory response. Consequently, returning a credit to the host-side controller each time a memory request is removed from the request queue at the memory-side controller may adversely impact memory system performance.

Furthermore, the memory device may include one or more memory response queues. A memory response queue can be present at the memory-side controller or any of the backend components of the memory device, like a memory controller. Oversaturating the response queues can also lower bandwidth and increase latency. A response queue can become "backed up" if, for instance, an internal or external interconnect is too busy or oversubscribed. For example, the interconnect between the host device and the memory device may be oversubscribed by the memory device or by other devices (e.g., another PCIe device) that is coupled to the interconnect. In such cases, this type of credit-return system can cause at least one response queue of the memory device to become filled, which may further slow the memory device sufficiently to adversely impact bandwidth and latency.

Decreased processing bandwidth and increased latency of a memory device may be categorized as poor performance. Slow memory performance can cause system-level problems and create user dissatisfaction. Especially if the poor performance conflicts with advertised performance capabilities or a published technical specification, such as a quality-of-service (QoS) indication, the user may blame the manufacturer of the memory device. This can happen even if the host device is contributing to the bandwidth and latency issues by sending too many memory requests to the memory device due to an inadequate credit-based communications scheme.

To address this situation, and at least partly ameliorate it, this document describes example approaches to managing the flow of memory requests in devices and systems that use a credit-based scheme to control memory request flows. One approach may include adding simple circuitry to the device, such as one or more hardware registers that can store one or more values the host can read to limit the maximum number of outstanding requests in the system at any given point of time. For example, the number of outstanding memory requests may include a quantity of memory requests that are present or extant on the memory device, that are currently being processed by the memory device, and/or that are pending within the memory device. In some cases, the registers can be configured by a manufacturer when assembling or testing the device. The manufacturer determines appropriate limits or safe capabilities of the system, based on the components and circuitries, and can publish the overall capabilities (e.g., QoS) based on the determined limits. When the memory device is connected to a host, the host can read at least one value in at least one register and limit the number of memory requests sent to the device based on the at least one value.

Consider an example system that includes one or more registers, through which a total number of memory requests that are serviceable by the memory device (e.g., a number of memory requests that can be outstanding in or at the device or a number of memory requests that are authorized to be serviced by the memory device) can be communicated to the host side. The total number of memory requests that are serviceable by the memory device may be a number of memory requests that the memory device can service a time in to provide a certain quality of service (QoS) or meet another specified technical or performance parameter. For example, hardware registers located in or mapped to a PCI configuration space of the memory device (e.g., a CXL device) can be configured by the device manufacturer during fabrication, testing, assembly, or initialization. The registers can store one or more values indicating a total number of combined memory requests (e.g., write requests and read requests) that can be outstanding in the memory device. The number can be determined based on various factors, such as the round-trip time for a request to be unpackaged and forwarded from the memory-side controller until the memory response for that request is received at the memory-side controller (e.g., a pin latency of the device). Other factors can include the time it takes memory requests to flow through the various interconnects, controllers, and queues inside the memory device as described above (e.g., which can impact a propagation latency of the device) and/or can include the backend memory configuration (e.g., of one or more DRAM components of a memory expander).

The host can read the registers during an initialization or boot process when a new device is connected to the system (e.g., a hot-plug installation) or when connected devices boot up (e.g., at power-up or upon exiting a sleep or hibernation mode). In some implementations, the hardware registers can include three different registers or multiple registers to communicate three different values. One register can be a total request register (e.g., a CXL_Device_Max_Total_Request_Outstanding_Limit_REG) that indicates the total combined number of read and write requests that can be outstanding in the memory device. The other two registers can separately indicate the number of read and write requests that can be outstanding in the memory device (e.g., a CXL_Device_Max_Read_Request_Outstanding_Limit_REG and a CXL_Device_Max_Write_Request_Outstanding_Limit_REG). The host device can then control the number of memory requests that it has outstanding at any given moment according to the values read from the registers. Depending on the configuration of the registers, the host can limit only the total combined number of requests (e.g., both read and write requests), the total combined number and one or both of the read/write requests, just the number of read requests, or just the number of write requests to maintain the performance of the system as advertised or otherwise specified.

By employing one or more of these implementations, a memory device can obtain greater control over the flow of memory requests received from a host device. Controlling the flow of memory requests in this way may enable the device to operate more efficiently and within advertised performance specifications, such as a given QoS. Further, these implementations can allow device manufacturers to combine components and subsystems from different vendors and configure the device to operate within the defined specifications and with the defined QoS. This gives manufacturers mores choices when building devices, which can allow them to offer more products at different performance and price points. In turn, customers can select devices and systems that meet both their technical needs and budget constraints confident that the selected hardware will achieve the advertised capabilities.

Although some implementations are described above in terms of a memory-side controller of a memory device performing certain techniques, a host-side controller of a host device may alternatively perform the same or similar techniques. Examples of host-side implementations are described further herein.

Example Operating Environments

FIG. 1 illustrates, at 100 generally, example apparatuses 102 that can implement aspects of a memory-flow control register. The apparatus 102 can be realized as, for example, at least one electronic device. Example electronic-device implementations include an internet-of-things (IoTs) device 102-1, a tablet device 102-2, a smartphone 102-3, a notebook computer 102-4 (or a desktop computer), a passenger vehicle 102-5 (or other vehicle), a server computer 102-6, a server cluster 102-7 that may be part of cloud computing infrastructure or a data center, and a portion thereof (e.g., a printed circuit board (PCB) or module component).

Other examples of the apparatus 102 include a wearable device, such as a smartwatch or intelligent glasses; an entertainment device, such as a set-top box or streaming dongle, a smart television, a gaming device, or virtual reality (VR) goggles; a motherboard or blade of a server; a consumer appliance; a vehicle or drone, or the electronic components thereof; industrial equipment; a security or other sensor device; and so forth. Each type of electronic device or other apparatus can include one or more components to provide some computing functionality or feature that is enabled or enhanced by the hardware or techniques that are described herein.

In example implementations, the apparatus 102 can include at least one host device 104, at least one interconnect 106, and at least one memory device 108. The host device 104 can include at least one processor 114, at least one cache memory 116, and at least one controller 118. The memory device 108 may include at least one controller 110 and at least one memory 112. The memory 112 may be realized with one or more memory types.

The memory 112 may be realized, for example, with a dynamic random-access memory (DRAM) die or module, including with a three-dimensional (3D) stacked DRAM device, such as a high bandwidth memory (HBM) device or a hybrid memory cube (HMC) device. DRAM may include, for instance, synchronous DRAM (SDRAM) or double data rate (DDR) DRAM (DDR DRAM). The memory 112 may also be realized using static random-access memory (SRAM). Thus, the memory device 108 may operate as a main memory or a cache memory, including as both. Alternatively, the memory device 108 may operate as storage memory. In such cases, the memory 112 may be realized, for example, with a storage-class memory type, such as one employing 3D XPoint™ or phase-change memory (PCM), flash memory, a magnetic hard disk, or a solid-state drive (e.g., a Non-Volatile Memory Express® (NVMe®) device).

Regarding the host device 104, the processor 114 can be coupled to the cache memory 116, and the cache memory 116 can be coupled to the controller 118. The processor 114 can also be coupled to the controller 118 directly or indirectly (e.g., via the cache memory 116 as depicted). The host device 104 may include other components to form, for instance, a system-on-a-chip or a system-on-chip (SoC). The processor 114 may include or comprise a general-purpose processor, a central processing unit (CPU), a graphics processing unit (GPU), a neural network engine or accelerator, an application-specific integrated circuit (ASIC), a field-programmable gate array (FPGA) integrated circuit (IC), a communication processor (e.g., a modem or baseband processor), an SoC, and so forth.

In operation, the controller 118 can provide a high-level or logical interface between the processor 114 and at least one memory device, such as a memory that is external to the host device 104. The controller 118 can, for example, receive memory requests from the processor 114 and provide the memory requests to an external memory with appropriate formatting, packaging, timing, reordering, and so forth. The controller 118 can forward to the processor 114 responses to the memory requests that the controller 118 receives from the external memory.

The controller 118 may communicate with multiple memory devices (or other types of devices, some of which may include one or more memory components) over one or more interconnects, such as the interconnect 106. Regarding connections that are external to the host device 104, the host device 104 can be coupled to the memory device 108 via the interconnect 106 (e.g., using interfaces). The memory device 108 may be coupled to, or may include, a main memory or a storage memory, including both in some cases. Another device, such as a cache memory or a switch, may be coupled between the host device 104 and the memory device 108 and may be part of or separate from the interconnect 106.

The depicted interconnect 106, as well as other interconnects (not shown) that communicatively couple together various components, enables data to be transferred between two or more components of the various components. Interconnect examples include a bus, a switching fabric, a crossbar, one or more wires that carry voltage or current signals, and so forth. The interconnect 106 can be implemented as a parallel propagation pathway. For example, the interconnect 106 can include at least one command and address bus and at least one data bus, each of which carries multiple bits simultaneously each clock period. Each bus may be implemented as a unidirectional bus or a bidirectional bus. Alternatively, the interconnect 106 can be implemented as a serial propagation pathway. For instance, the interconnect 106 can comport with a PCIe standard, such as version 4, 5, 6, or a future version. The interconnect 106 may include multiple serial propagation pathways, such as multiple lanes in a PCIe implementation.

The components of the apparatus 102 that are depicted in FIG. 1 represent an example computing architecture that may include a hierarchical memory system. A hierarchical memory system can include memories at different levels, with each level having a memory with a different speed, capacity, or volatile/nonvolatile characteristic. Thus, the memory device 108 may be described in terms of forming at least part of a main memory of the apparatus 102. The memory device 108 may, however, form at least part of a cache memory, a storage memory, an SoC, and so forth of an apparatus 102.

Although various implementations of the apparatus 102 are depicted in FIG. 1 and described herein, an apparatus 102 can be implemented in alternative manners. For example, the host device 104 may include multiple cache memories, including multiple levels of cache memory, or may omit a cache memory. A memory, such as the memory device 108, may have a respective "internal" or "local" cache memory (not shown). In some cases, the host device 104 may omit the processor 114 and/or include other logic. Generally, the illustrated and described components may be implemented in alternative ways, including in distributed or shared memory systems. A given apparatus 102 may also include more, fewer, or different components than those depicted in FIG. 1 and described herein.

The host device 104 and any of the various memories may be realized in multiple manners. In some cases, the host device 104 and the memory device 108 may be located on separate blades or racks in a server computing environment. In other cases, the host device 104 and the memory device 108 can both be disposed on, or physically supported by, a same printed circuit board (PCB) (e.g., a rigid or flexible motherboard or PCB assembly). The host device 104 and the memory device 108 may also be integrated on a same IC or fabricated on separate ICs but packaged together.

A memory device 108 may also be coupled to multiple host devices 104 via one or more interconnects 106 and may be able to respond to memory requests from two or more of the multiple host devices 104. Each host device 104 may include a respective controller 118, or the multiple host devices 104 may share a common controller 118. An example computing system architecture with at least one host device 104 that is coupled to a memory device 108 is described below with reference to FIG. 2.

With continuing reference to FIG. 1, however, the interconnect 106 may propagate one or more communications. The host device 104 and the memory device 108 may exchange at least one memory request/memory response 120. For example, the controller 118 may transmit a memory request to the controller 110 over the interconnect 106. Thus, the controller 110 may transmit a corresponding memory response to the controller 118 over the interconnect 106. In some cases, the interconnect 106 is operated in accordance with a credit-based protocol. Accordingly, credit-related information 122 may be exchanged between the host device 104 and the memory device 108. For instance, the controller 110 may transmit a credit return to the controller 118 to enable the controller 118 to transmit another memory request.

Thus, the host device 104 and the memory device 108 can communicate using a credit-based protocol. The controller 110 of the memory device 108 can include credit logic 124, and the controller 118 of the host device 104 can include credit logic 126. In example implementations, the credit logic 124 and/or the credit logic 126 can facilitate communication over the interconnect 106 using at least one protocol that operates based on credits.

A credit-based protocol can use tokens or another quantity-based permissions scheme to authorize an initiator and/or a target to communicate with the target and/or the initiator, respectively. For example, the controller 118 may transmit a communication (e.g., a memory request) over the interconnect 106 to the controller 110 responsive to possessing at least one credit. This transmission "consumes" the at least one credit. The credit logic 124 of the controller 110 can moderate the flow of communications from the controller 118 by modulating the frequency or rate at which the credit logic 124 returns credits to the credit logic 126 of the controller 118. Example techniques for modulating such credit returns are described herein to increase memory-request processing bandwidth or to decrease memory response latency. Examples of credit-based protocols are described below with reference to FIG. 4.

In some implementations, the apparatus 102 operates one or more protocols over the interconnect 106. The apparatus 102 can operate, for example, a Compute Express Link™ (CXL) protocol across the interconnect 106. In at least some of these cases, the apparatus 102 can overlay the CXL protocol on top of a PCIe protocol for the physical layer. Thus, the controller 118 can comport with a CXL standard or a PCIe standard, including both. Similarly, the controller 110 can comport with a CXL standard or a PCIe standard, including both. Examples of credit-based aspects of one or more versions of a CXL standard are described below with reference to FIG. 4.

The memory device 108 can also include at least one register 128. The register 128 may be a hardware register, such as a read-only register or a read-write register. In some implementations in which the apparatus 102 operates in accordance with the CXL protocol and/or the PCIe protocol across the interconnect 106, the at least one register 128 can be mapped to a PCIe configuration space or a CXL device configuration space (e.g., as described with reference to a standard, such as the CXL standard version 1.0, 1.1, 2.0, or a later version). The register 128 can be separate from the controller 110 (as depicted) or integrated with the controller 110. The one or more values stored in the register 128 can be read by the host device 104 via the interconnect 106 (e.g., the controller 118, the processor 114, or another component can read values from the register 128 over the interconnect 106). Accordingly, the host device 104 and the memory device 108 may exchange register-related information 130. For example, the host device 104 (e.g., the controller 118) can transmit a request to read the values stored in the register 128 and receive a response from the memory device that includes the values (e.g., from the register 128 via the interconnect 106).

The at least one register 128 can be used to address some of the inefficiencies associated with credit-based memory flow protocols in CXL devices, as described above. For example, the register 128 can store values that indicate a number of memory requests (e.g., read requests, write requests, or both) that are serviceable by the memory device 108 (e.g., a number of memory requests that can be outstanding in or at the memory device 108 or a number of memory requests that are authorized to be serviced by the memory device 108). The total number of memory requests that are serviceable by the memory device may be a number of memory requests that the memory device can service a time in to provide a certain quality of service (QoS) or meet another specified technical or performance parameter. For example, "outstanding" memory requests can include memory requests (read and/or write) that are pending or extant on the memory device 108, memory requests that have been received at the memory device 108 but not processed, memory requests that have been received by the memory device 108 but not responded to yet, memory requests are in-progress in downstream or backend components of the memory device 108, combinations thereof, and so forth.

The one or more values can be based on factors other than solely the available credits for requests. These factors can include, for example, a so-called "pin latency" of the memory device 108 (e.g., a round trip time for a memory request to be forwarded from the controller 110 to the memory 112 and for the response to be received back at the controller 110). Other factors include capacity and available space in memory queues or buffers internal to the memory device 108, propagation latency within the memory device 108, and/or a configuration of the memory 112. When the host device 104 receives the response from the register 128 (e.g., as part of the exchange of register-related information 130), which includes the values stored in the register 128, the host device 104 (e.g., the controller 118) can control a quantity of memory requests outstanding in the memory device based on the values. Additional details regarding the operation of the apparatus 102 with respect to the register 128 are described with reference to FIG. 5. Other circuitry, techniques, and mechanisms are also described below. Next, however, example computing architectures with one or more processors and a memory device are described next.

Figure 2:
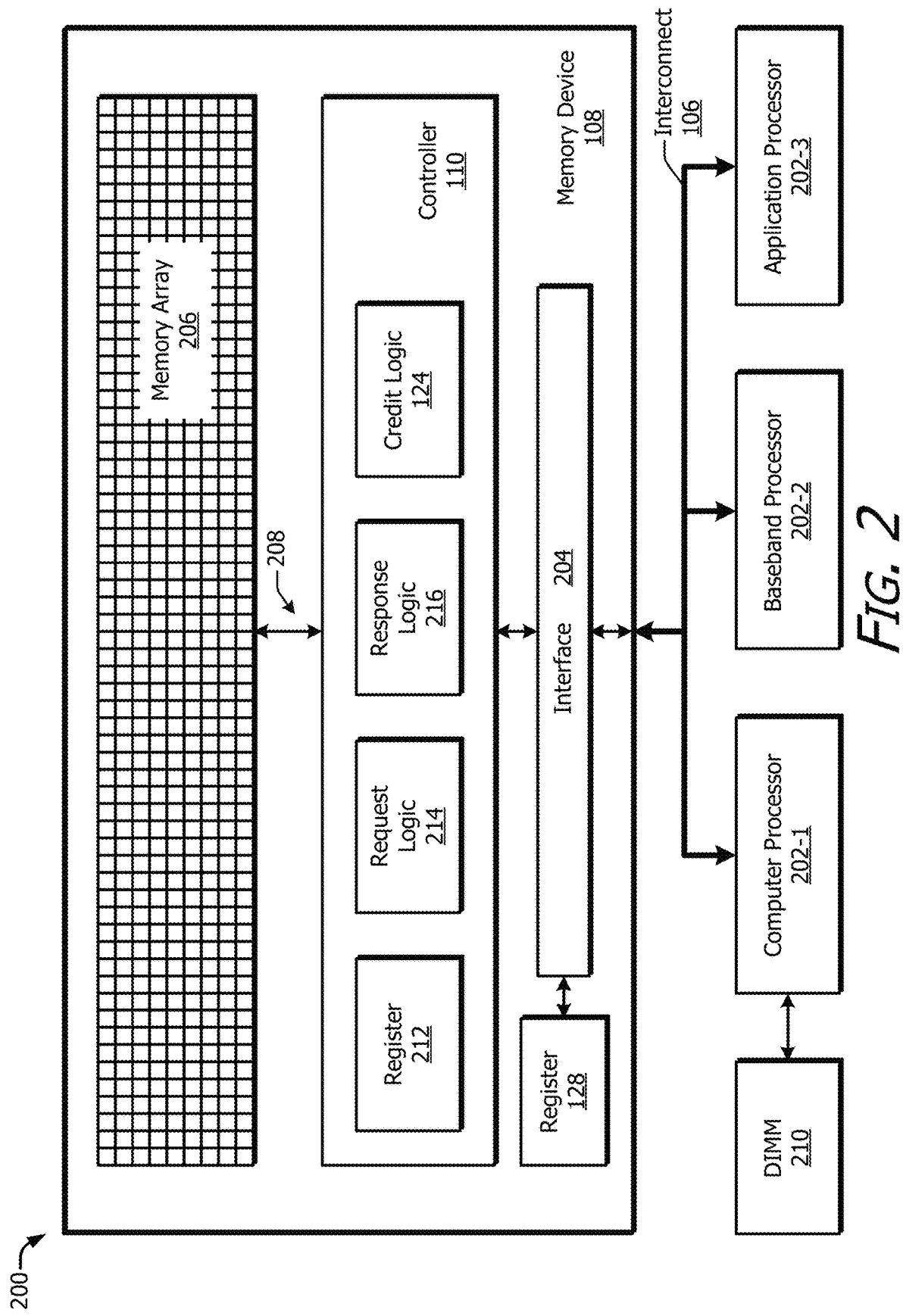
FIG. 2 illustrates example computing systems that can implement aspects of a memory-flow control register with a memory device.

FIG. 2 illustrates an example computing system 200 that can implement aspects of the memory-flow control register in a memory device. In some implementations, the computing system 200 includes at least one memory device 108, at least one interconnect 106, and at least one processor 202. The memory device 108 can include, or be associated with, at least one memory array 206, at least one interface 204, and at least one controller 110. The at least one controller 110 can be communicatively coupled to the memory array 206 via at least one interconnect 208 (e.g., an "internal" interconnect). The memory array 206 and the controller 110 may be components that are integrated on a single semiconductor die or located on separate semiconductor dies (e.g., but still coupled to or disposed on a same PCB). Each of the memory array 206 or the controller 110 may also be distributed across multiple dies.

The memory device 108 can correspond to one or more of a cache memory, main memory, or storage memory of the apparatus 102 of FIG. 1. Thus, the memory array 206 can include an array of memory cells. These memory cells can include, but are not limited to, memory cells of Static Random-Access Memory (SRAM), Dynamic Random-Access Memory (DRAM), Synchronous DRAM (SDRAM), three-dimensional (3D) stacked DRAM, Double Data Rate (DDR) memory, low-power Dynamic Random-Access Memory (DRAM), Low-Power Double Data Rate (LPDDR) Synchronous Dynamic Random-Access Memory (SDRAM), phase-change memory (PCM), or flash memory.

The controller 110 can include any one or more of a number of components that can be used by the memory device 108 to perform various operations. These operations can include communicating with other devices, managing performance, modulating memory access rates, and performing memory read or write operations. For example, the controller 110 can include at least one register 212, at least one instance of request logic 214, at least one instance of response logic 216, and at least one instance of credit logic 124.

The register 212 may be implemented, for example, as one or more registers that can store information to be used by the controller 110, by another part of the memory device 108, or by a part of a host device 104, such as a controller 118 as depicted in FIG. 1. A register 212 may store, for instance, a maximum credit level, a parameter controlling a flow-modulation process using credits, and so forth. In some implementations, the memory device 108 also includes the register 128 as a separate component (as shown in FIG. 1 and FIG. 2). In other implementations (as shown, for example, in FIG. 4), the register 128 may be part of another component (e.g., the controller 110). In other cases (not shown in FIG. 2), the register 212 may include, or perform the functions of, the register 128, as described with reference to FIG. 1, FIG. 3, and/or FIG. 5. As described with reference to FIG. 1, values stored in the register 128 (or the register 212) can be read by another device, such as the host device 104 or the processor 202. The values stored in the register 128 can indicate, for example, a number of memory requests that are serviceable by (e.g., can be outstanding in or at) the memory device 108 (e.g., read requests, write requests, and/or a combination of read and write requests). As shown in the example computing system 200 depicted in FIG. 2, values stored in the register 128 can be read via the interface 204 and the interconnect 106.

The request logic 214 can process one or more memory requests, such as by formulating a request, directing a request to a next or final destination, or performing a memory access operation (e.g., a read or a write operation). The response logic 216 can prepare at least one memory response, such as by obtaining requested data or generating a write acknowledgement. The credit logic 124 can modulate the flow of memory requests across the interconnect 106 using credits, which is described further below, including with reference to FIG. 4.

The interface 204 can couple the controller 110 or the memory array 206 directly or indirectly to the interconnect 106. As shown in FIG. 2, the register 212, the request logic 214, the response logic 216, and the credit logic 124 can be part of a single component (e.g., the controller 110). In other implementations, one or more of the register 212, the request logic 214, the response logic 216, or the credit logic 124 may be implemented as separate components, which can be provided on a single semiconductor die or disposed across multiple semiconductor dies. These components of the controller 110 may be individually or jointly coupled to the interconnect 106 via the interface 204.

The interconnect 106 may be implemented with any one or more of a variety of interconnects that communicatively couple together various components and enable commands, addresses, messages, packets, and/or other information and data to be transferred between two or more of the various components (e.g., between the memory device 108 and any of the one or more processors 202). The information and data may be propagated over the interconnect 106 directly or using some form of encapsulation, such as packets, frames, or flits. Although the interconnect 106 is represented with a single line or arrow in FIG. 2, the interconnect 106 may include at least one bus, at least one switching fabric, at least one crossbar, one or more wires or traces that carry voltage or current signals, at least one switch, one or more buffers, at least one lane, and so forth.

In some aspects, the memory device 108 may be realized as a "separate" physical component relative to the host device 104 (of FIG. 1) or any of the processors 202. Examples of physical components that may be separate include, but are not limited to, a printed circuit board (PCB), which can be rigid or flexible; a memory card; a memory stick; and a memory module, including a single in-line memory module (SIMM), a dual in-line memory module (DIMM), a non-volatile memory express (NVMe) module. Thus, separate physical components may be located together within a same housing of an electronic device or of a memory product or may be distributed over a server rack, a data center, and so forth. Alternatively, the memory device 108 may be packaged or integrated with other physical components, including a host device 104 or a processor 202, such as by being disposed on a common PCB or combined together in a single device package or by being integrated into an SoC of an apparatus.

As shown in FIG. 2, the one or more processors 202 may include one or more of a computer processor 202-1, a baseband processor 202-2, or an application processor 202-3, which are coupled to the memory device 108 through the interconnect 106. The processors 202 may each be, or may form a part of, a CPU, a GPU, an SoC, an ASIC, an FPGA, or the like. In some cases, a single processor can comprise multiple processing cores or resources, each dedicated to different functions, such as modem management, applications, graphics, central processing, neural network acceleration, or the like. In some implementations, the baseband processor 202-2 may include or be coupled to a modem (not shown in FIG. 2) and may be referred to as a modem processor. The modem and/or the baseband processor 202-2 may be coupled wirelessly to a network via, for example, cellular, Wi-Fi®, Bluetooth®, ultra-wideband (UWB), near field, or another technology or protocol for wireless communication.

In various implementations, the processors 202 may be connected to different memories in different manners. For example, the processors 202 may be connected directly to the memory device 108 (e.g., via the interconnect 106 as shown). Alternatively, one or more of the processors 202 may be indirectly connected to the memory device 108, such as over a network connection, through one or more other devices or components, and/or also using at least one other interconnect. Each processor 202 may be realized similarly to the processor 114 of FIG. 1. Accordingly, a respective processor 202 can include or be associated with a respective controller, like the controller 118 depicted in FIG. 1. Alternatively, two or more processors 202 may access the memory device 108 using a shared or system controller 118. In any of such cases, the controller 118 may include credit logic 126 (e.g., of FIG. 1). Each processor 202 may also be separately connected to a respective memory. As shown, the computer processor 202-1 may be coupled to at least one DIMM 210 that is inserted into a DIMM slot of a motherboard. The DIMM 210 can be coupled to a memory controller (not shown) of the computer processor 202-1.

The apparatuses and methods that are described herein may be appropriate for memory that is designed for use with a PCIe bus. Thus, the described principles may be incorporated into a memory device with a PCIe interface. Further, the memory device can communicate over the interconnect 106 by overlaying a CXL protocol on the physical PCIe interface. An example of a memory standard that relates to CXL is promulgated by the Compute Express Link consortium and may include versions 1.0, 1.1, 2.0, and future versions. Thus, the host device 104 or the memory device 108, including both in some cases, may comport with at least one CXL standard. Accordingly, some terminology in this document may draw from one or more of these standards or versions thereof for clarity. The described principles, however, are also applicable to memories that comport with other standards, including earlier versions or future versions of such standards, and to memories that do not adhere to a public standard. Examples of systems that may include a PCIe interface and a CXL protocol overlay are described with reference to FIG. 3, FIG. 4, and FIG. 5.

Figure 3:
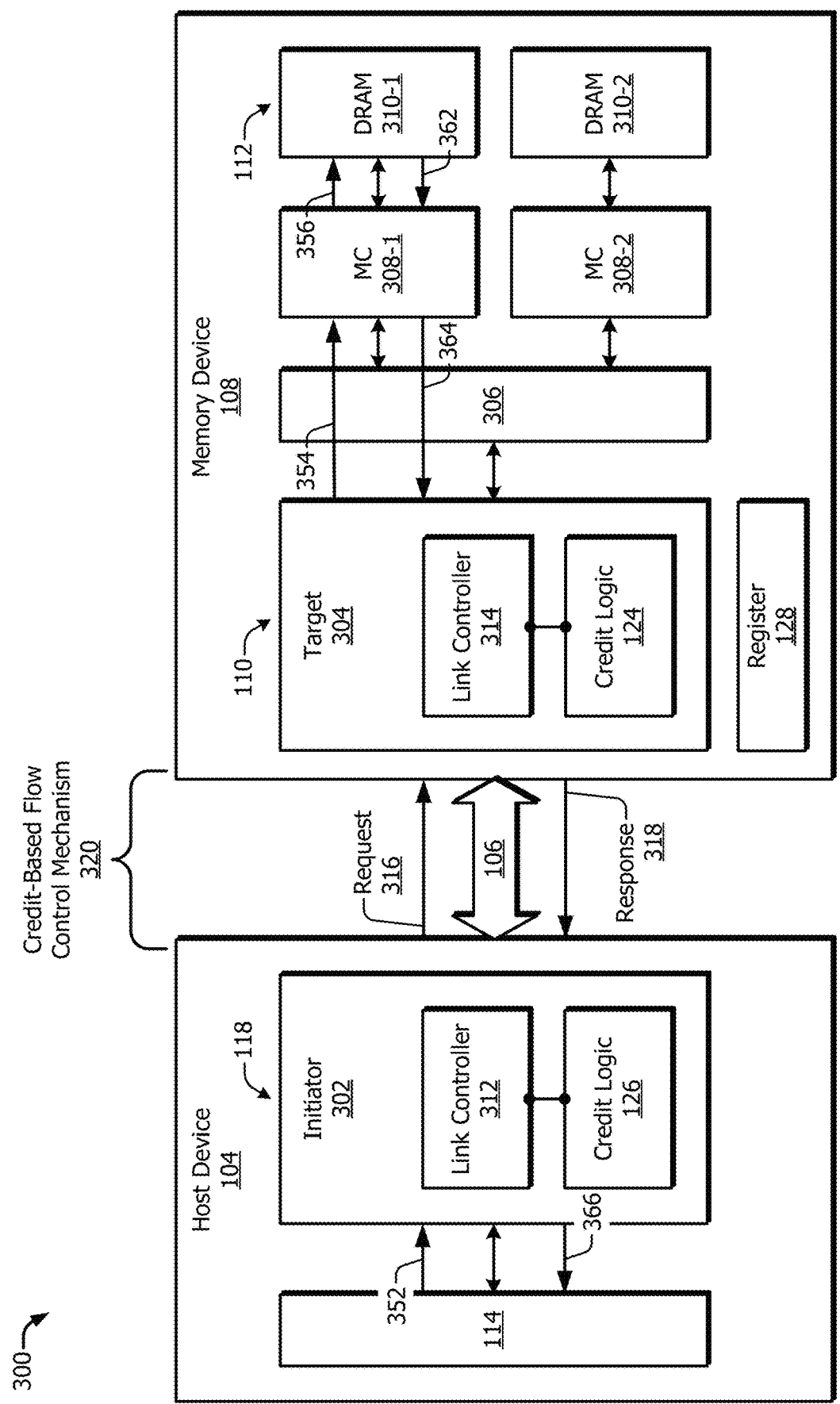
FIG. 3 illustrates examples of a system that can include a host device and a memory device coupled together via an interconnect and that can implement aspects of a memory-flow control register.

FIG. 3 illustrates examples of a system 300 that can include a host device 104 and a memory device 108 that are coupled together via an interconnect 106 and that can implement aspects of a memory-flow control register. The system 300 may form at least part of an apparatus 102 as shown in FIG. 1. As illustrated, the host device 104 includes a processor 114 and a controller 118, which can be realized with at least one initiator 302. Thus, the initiator 302 can be coupled to the processor 114 or to the interconnect 106 (including to both), and the initiator 302 can be coupled between the processor 114 and the interconnect 106. Examples of initiators 302 may include a leader, a primary, a master, a requester or requesting component, a main component, and so forth.

In the illustrated example system 300, the memory device 108 includes a controller 110, which may be realized with at least one target 304. The target 304 can be coupled to the interconnect 106. Thus, the target 304 and the initiator 302 can be coupled to each other via the interconnect 106. Examples of targets 304 may include a follower, a secondary, a slave, a responder or responding component, and so forth. The memory device 108 also includes a memory 112, which may be realized with at least one memory module or chip or with another component, such as a DRAM 310, as is described below. In some implementations, the memory device 108 also includes the register 128 as a separate component (as shown in FIG. 1 and FIG. 2). In other implementations (as shown, for example, in FIG. 4), the register 128 may be part of another component (e.g., the controller 110). In other cases (not shown in FIG. 2 or FIG. 3), another register or component, such as the register 212, may include, or perform the functions of, the register 128 or the register 520. The host device 104 can read values stored in the register 128 (or in the registers 212 or 520) via the interconnect 106, as described with reference to FIGS. 1-5. For clarity in FIG. 3, the connection between the register 128 and the host device 104 is omitted.

In example implementations, the initiator 302 includes at least one link controller 312, and the target 304 includes at least one link controller 314. The link controller 312 or the link controller 314 can instigate, coordinate, cause, or otherwise participate in or control signaling across a physical or logical link realized by the interconnect 106 in accordance with one or more protocols, including for example either or both of the CXL protocol or the PCIe protocol. The link controller 312 may be coupled to the interconnect 106. The link controller 314 may also be coupled to the interconnect 106. Thus, the link controller 312 can be coupled to the link controller 314 via the interconnect 106. Each link controller 312 or 314 may, for instance, control communications over the interconnect 106 at a link layer or at one or more other layers of a given protocol. Communication signaling may include, for example, a request 316, a response 318, and so forth.

The memory device 108 may further include at least one interconnect 306 and at least one memory controller 308 (MC 308). Within the memory device 108, and relative to the target 304, the interconnect 306, the memory controller 308, and/or the DRAM 310 (or other memory component) may be referred to as a "backend" component of the memory device 108. In some cases, the interconnect 306 is internal to the memory device 108 and may operate the same as or differently from the interconnect 106.

As shown, the memory device may include multiple memory controllers 308-1 and 308-2 and/or multiple DRAMs 310-1 and 310-2. Although two of each are shown, the memory device 108 may include one or more than two memory controllers and/or one or more than two DRAMs. For example, a memory device 108 may include four memory controllers and 16 DRAMs, such as four DRAMs per memory controller. The memory components of the memory device 108 are depicted as DRAM as only an example, for one or more of the memory components may be implemented as another type of memory. For instance, the memory components may include nonvolatile memory like flash or PCM. Alternatively, the memory components may include other types of volatile memory like SRAM. A memory device 108 may also include any combination of memory types.

In some cases, the memory device 108 may include the target 304, the interconnect 306, the at least one memory controller 308, and the at least one DRAM 310 within a single housing or other enclosure. The enclosure, however, may be omitted or may be merged with one for the host device 104, the system 300, or an apparatus 102 (of FIG. 1). The interconnect 306 can be disposed on a PCB. Each of the target 304, the memory controller 308, and the DRAM 310 may be fabricated on at least one IC and packaged together or separately. The packaged ICs may be secured to or otherwise supported by the PCB (or PCB assembly) and may be directly or indirectly coupled to the interconnect 306. The components of the memory device 108 may, however, be fabricated, packaged, combined, and/or housed in other manners.

As illustrated in FIG. 3, the target 304, including the link controller 314 thereof, can be coupled to the interconnect 306. Each memory controller 308 of the multiple memory controllers 308-1 and 308-2 can also be coupled to the interconnect 306. Accordingly, the target 304 and each memory controller 308 of the multiple memory controllers 308-1 and 308-2 can communicate with each other via the interconnect 306. Each memory controller 308 is coupled to at least one DRAM 310. As shown, each respective memory controller 308 of the multiple memory controllers 308-1 and 308-2 is coupled to at least one respective DRAM 310 of the multiple DRAMs 310-1 and 310-2. Each memory controller 308 of the multiple memory controllers 308-1 and 308-2 may, however, be coupled to a respective set of multiple DRAMs or other memory components.

Each memory controller 308 can access at least one DRAM 310 by implementing one or more memory access protocols to facilitate reading or writing data based on at least one memory address. The memory controller 308 can increase bandwidth or reduce latency for the memory accessing based on a type of the memory or an organization of the memory components, such as the multiple DRAMs. The multiple memory controllers 308-1 and 308-2 and the multiple DRAMs 310-1 and 310-2 can be organized in many different manners. For example, each memory controller 308 can realize one or more memory channels for accessing the DRAMs. Further, the DRAMs can be manufactured to include one or more ranks, such as a single-rank or a dual-rank memory module. Each DRAM 310 (e.g., at least one DRAM IC chip) may also include multiple banks, such as 8 or 16 banks.

This document now describes examples of the host device 104 accessing the memory device 108. The examples are described in terms of a general memory access (e.g., a memory request) which may include a memory read access (e.g., a memory read request for a retrieval operation) or a memory write access (e.g., a memory write request for a storage operation). The processor 114 can provide a memory access request 352 to the initiator 302. The memory access request 352 may be propagated over a bus or other interconnect that is internal to the host device 104. This memory access request 352 may be or may include a read request or a write request. The initiator 302, such as the link controller 312 thereof, can reformulate the memory access request into a format that is suitable for the interconnect 106. This formulation may be performed based on a physical protocol or a logical protocol (including both) applicable to the interconnect 106. Examples of such protocols are described below.

The initiator 302 can thus prepare a request 316 and transmit the request 316 over the interconnect 106 to the target 304. The target 304 receives the request 316 from the initiator 302 via the interconnect 106. The target 304, including the link controller 314 thereof, can process the request 316 to determine (e.g., extract, decode, or interpret) the memory access request. Based on the determined memory access request, the target 304 can forward a memory request 354 over the interconnect 306 to a memory controller 308, which is the first memory controller 308-1 in this example. For other memory accesses, the targeted data may be accessed with the second DRAM 310-2 through the second memory controller 308-2. Thus, the first memory controller 308-1 receives the memory request 354 via the internal interconnect 306.

The first memory controller 308-1 can prepare a memory command 356 based on the memory request 354. The first memory controller 308-1 can provide the memory command 356 to the first DRAM 310-1 over an interface or interconnect appropriate for the type of DRAM or other memory component. The first DRAM 310-1 receives the memory command 356 from the first memory controller 308-1 and can perform the corresponding memory operation. Based on the results of the memory operation, the first DRAM 310-1 can generate a memory response 362. If the memory request 316 is for a read operation, the memory response 362 can include the requested data (e.g., a data response message, such as S2M DRS MemData). If the requested data is not available, the memory-side controller can return a no-data response message, such as, S2M NDR Cmp. If the memory request 316 is for a write operation, the memory response 362 can include an acknowledgement that the write operation was performed successfully (e.g., with a write-complete message such as S2M NDR Cmp). The first DRAM 310-1 can provide the memory response 362 to the first memory controller 308-1.

To fulfill a read request, the memory-side controller returns the requested data as the memory response, such as a subordinate-to-master data-response message (e.g., a data response message, such as S2M DRS MemData). If the requested data is not available, the memory-side controller can return a no-data response (NDR) message (e.g., S2M NDR Cmp). To fulfill a write request, the memory-side controller can acknowledge that the write operation was completed as the memory response (e.g. an S2M NDR Cmp message).

The first memory controller 308-1 receives the memory response 362 from the first DRAM 310-1. Based on the memory response 362, the first memory controller 308-1 can prepare a memory response 364 and transmit the memory response 364 to the target 304 via the interconnect 306. The target 304 receives the memory response 364 from the first memory controller 308-1 via the interconnect 306. Based on this memory response 364, and responsive to the corresponding request 316, the target 304 can formulate a response 318 for the requested memory operation. The response 318 can include read data or a write acknowledgement and be formulated in accordance with one or more protocols of the interconnect 106.

To respond to the memory request 316 from the host device 104, the target 304 can transmit the response 318 to the initiator 302 over the interconnect 106. Thus, the initiator 302 receives the response 318 from the target 304 via the interconnect 106. The initiator 302 can therefore respond to the "originating" memory access request 352, which is from the processor 114 in this example. To do so, the initiator 302 prepares a memory access response 366 using the information from the response 318 and provides the memory access response 366 to the processor 114. In these manners, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 302 and the target 304. Generally, the interconnect 106 can carry memory-related information, such as data or a memory address, between the initiator 302 and the target 304. In some cases, the initiator 302 or the target 304 (including both) can prepare memory-related information for communication across the interconnect 106 by encapsulating such information. The memory-related information can be encapsulated into, for example, at least one packet (e.g., a flit). One or more packets may include at least one header with information indicating or describing the content of each packet.

In example implementations, the interconnect 106 can support, enforce, or enable memory coherency for a shared memory system, for a cache memory, for combinations thereof, and so forth. Additionally or alternatively, the interconnect 106 can be operated based on a credit allocation system. Thus, the initiator 302 and the target 304 can communicate using, for example, a credit-based flow control mechanism 320. Possession of a credit can enable an entity, such as the initiator 302, to transmit another memory request 316 to the target 304. The target 304 may return credits to "refill" a credit balance at the initiator 302. The credit logic 124 of the target 304 or the credit logic 126 of the initiator 302 (including both instances of credit logic working together in tandem) can implement a credit-based communication scheme across the interconnect 106. Example aspects of a credit-based communication protocol are described below with reference to FIG. 4.

The system 300, the initiator 302, or the target 304 may operate or interface with the interconnect 106 in accordance one or more physical or logical protocols. For example, the interconnect 106 may be built in accordance with a Peripheral Component Interconnect Express® (PCIe or PCI-E) standard. Applicable versions of the PCIe standard may include 1.x, 2.x, 3.x, 4.0, 5.0, 6.0, and future or alternative versions. In some cases, at least one other standard is layered over the physical-oriented PCIe standard. For example, the initiator 302 or the target 304 can communicate over the interconnect 106 in accordance with a Compute Express Link™ (CXL) standard. Applicable versions of the CXL standard may include 1.x, 2.0, and future or alternative versions. Thus, the initiator 302 and/or the target 304 may operate so as to comport with a PCIe standard and/or a CXL standard. A CXL standard may operate based on credits, such as read credits and write credits. Example aspects of credit types, credit allocation, credit usage, and flow control via credits are described next with reference to FIG. 4.

Example Techniques and Hardware

Figure 4:
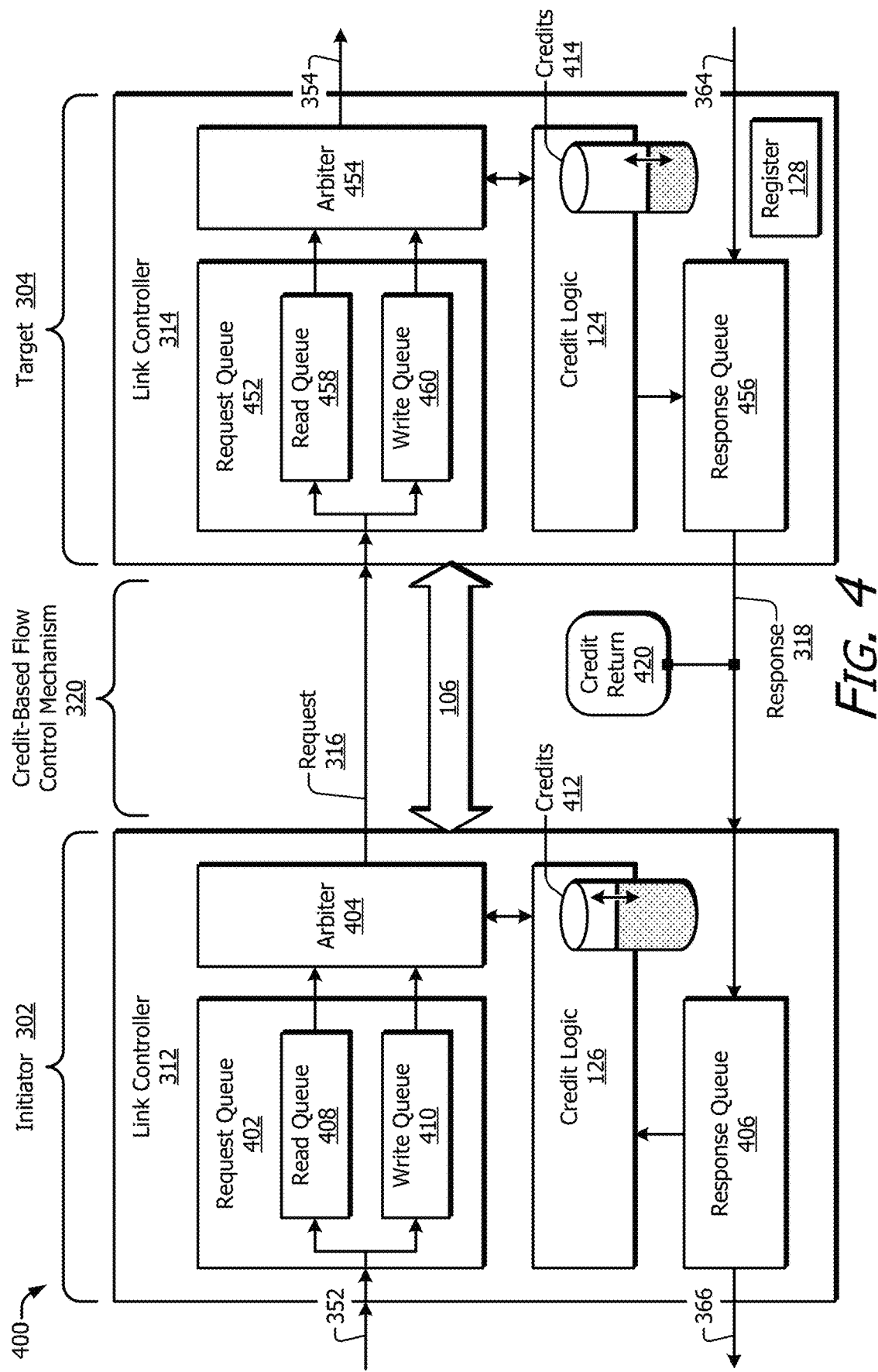
FIG. 4 illustrates examples of controllers for an initiator and a target that can communicate across an interconnect that employs a credit-based protocol and that can implement aspects of a memory-flow control register.

FIG. 4 illustrates, at 400 generally, examples of controllers for an initiator 302 and a target 304 that can communicate across an interconnect 106 that employs a credit-based protocol. The initiator 302 can include a link controller 312, and the target 304 can include a link controller 314. As also shown in FIGS. 1 and 3, the link controller 312 can include credit logic 126, and the link controller 314 can include credit logic 124. The credit logic 124 and the credit logic 126 can support implementation of a credit-based flow control mechanism 320 that permits one or more communications based on possession of at least one credit.

In example implementations, the link controller 312 or the link controller 314, including both link controllers, can communicate across the interconnect 106 using a credit-based protocol. A credit-based protocol can be realized using, for instance, the credit-based flow control mechanism 320. To do so, the credit logic 126 can monitor a quantity of one or more credits 412, and the credit logic 124 can monitor one or more credits 414. Generally, the credit logic 126 permits the link controller 312 to transmit a communication, such as a request 316, to the link controller 314 based on the one or more credits 412. Transmitting the request 316 may use or "consume" one credit of the one or more credits 412. Based on the one or more credits 414, the credit logic 124 at the link controller 314 can modulate the rate of transmission from the link controller 312 by controlling the transmission of a credit return 420. The credit return 420 can replenish an indicated quantity of the one or more credits 412 at the credit logic 126. This credit usage is described further below.

As illustrated in FIG. 4, the link controller 312 can include at least one request queue 402, at least one arbiter 404, at least one response queue 406, and at least one instance of the credit logic 126. The link controller 314 can include at least one request queue 452, at least one arbiter 454, at least one response queue 456, and at least one instance of the credit logic 124. In some cases, a request queue 402 or 452 may be split into a read path and a write path. Thus, the request queue 402 may include at least one read queue 408 and at least one write queue 410. Similarly, the request queue 452 may include at least one read queue 458 and at least one write queue 460.

In example operations for an initiator 302, the link controller 312 can receive a memory access request 352 at the request queue 402. The request queue 402 routes the request into the read queue 408 or the write queue 410 based on whether the memory access request is for a read operation or a write operation, respectively. The arbiter 404 controls access to the interconnect 106 based on instructions or commands from the credit logic 126. The credit logic 126 authorizes the arbiter 404 to transmit a request 316 over the interconnect 106 based on possession of the one or more credits 412. For example, the credit logic 126 may permit the arbiter 404 to transmit one request 316 per available credit 412. If the credit logic 126 does not currently possess any credits 412, the arbiter 404 can be prevented from transmitting a request 316 (e.g., by the credit logic 126 blocking or not authorizing such a transmission).

The response queue 406 can buffer multiple responses 318 received from the link controller 314 via the interconnect 106. Each response 318 may include a least one memory response (e.g., with read data or a write acknowledgment) or at least one credit return 420. Thus, a response 318 may include a memory response and a credit return 420. For a memory response, the response queue 406 buffers the response until the response queue 406 can provide the memory access response 366 to the processor 114 (of FIGS. 1 and 3). For a credit return 420, the response queue 406, including associated logic, can forward the quantity of credits returned 420 to the credit logic 126. The credit logic 126 can therefore replenish at least a portion of the credits 412.

Continuing with example operations, but for a target 304, the link controller 314 can receive the request 316 at the request queue 452. The request queue 452 can then route the request 316 into the read queue 458 or the write queue 460 depending on whether it is a read request or a write request, respectively. The arbiter 454 can select a read request from the read queue 458 or a write request from the write queue 460 for transmission as the memory request 354 to a downstream component, such as a memory controller. Responsive to transmission of a memory request 354 corresponding to a request 316 that was stored in the request queue 452, the arbiter 454 notifies the credit logic 124 that the request 316 has been transmitted to a downstream component of the memory device 108 (e.g., of FIGS. 1-3). Accordingly, the credit logic 124 can add a credit 414 to the collection of one or more credits 414 that are earmarked to be returned to the link controller 312.

Thus, the credit logic 124 can track (e.g., maintain a record of) how many credits 414 can be returned to the credit logic 126 because the link controller 314 has forwarded a corresponding request 316 from the request queue 452 to a downstream component of the memory device 108. The credit logic 124 notifies the response queue 456 responsive to the presence of credits 414 to be returned to the credit logic 126. When a memory response 364 is received at the response queue 456, the response queue 456 stores the memory response 364. In conjunction with transmitting the memory response 364 as a response 318 to the link controller 312, the response queue 456 can include at least one credit return 420. The credit return 420 can indicate a quantity of credits 414 that are being returned to the credit logic 126 to increase the quantity of credits 412.

In these manners, the link controller 314 can use the credit-based protocol to control (e.g., block, gate, modulate, or moderate) the flow of requests 316 from the link controller 312. This can enable the link controller 314 to prevent the request queue 452 from overflowing from receiving too many requests 316 (e.g., from receiving requests 316 faster than they can be forwarded downstream). Additionally or alternatively, a credit-based protocol can also be used to control the flow of responses 318 from the link controller 314 to the link controller 312. The response queue 456 of the link controller 314 may be blocked from transmitting a response 318 unless the credit logic 124 has a "response" credit (not separately shown in FIG. 4) to authorize such a response transmission. These response credits may be different from the one or more "request" credits 414 relating to the requests 316. In such scenarios, the credit logic 126 of the link controller 312 may return the response credits to the credit logic 124 responsive to issuances of memory access responses 366 from the response queue 406. Hence, the initiator 302 and the target 304 can implement the credit-based flow control mechanism 320 bidirectionally.

Various approaches can be employed for a credit-based communication protocol. For example, a credit may correspond to a transmission across an interconnect, to a packet, to a flit, or to a request or response. In some cases, a transmission may include multiple requests and/or multiple responses, such as by encapsulating them into a packet or flit. In some cases, a credit may correspond generally to any type of request or response so that an initiator can transmit any kind of request or response if the initiator possesses a credit. Additionally or alternatively, a credit may be specific to one or more types of requests or responses. Examples of communication types include read-related requests and write-related requests. Credits may also be particular as to whether data is allowed to be included in the corresponding transmission. These and other communication traits may be further combined to create other or additional specific types of credits.

By way of example, but not limitation, this document describes some implementations in terms of a credit system employed by certain CXL systems. Generally, the credit-based flow control mechanism for CXL can employ "backpressure" against a host device if one or more buffers of the memory device are full and therefore cannot receive any more requests (or any more responses on the return path). In some example systems, there can be three types of credits on an initiating device or a target device to control the flow of traffic between them: ReqCrd, DataCrd, and RspCrd. These credit types are a request credit (ReqCrd), a data credit (DataCrd), and a response credit (RspCrd).

The traffic can be classified as follows. For communications from the initiator to the target (e.g., from a host device to a memory device):
  REQ: Request without Data—generally Read Requests. These can be controlled using ReqCrd.
  RwD: Request with Data—generally Write Requests. These can be controlled using DataCrd.
For communications from the target to the initiator (e.g., from the memory device to the host device):
  DRS: Response with Data—generally Read Responses. These can be controlled using DataCrd.
  NDR: Response without Data—generally Write Acknowledgements.
  These can be controlled using RspCrd.

These example CXL terms can be applied to the general system of FIG. 4. At a host device, which can be represented by the initiator 302, the credit logic 126 decrements the ReqCrd value (e.g., a quantity for the one or more credits 412) responsive to forwarding a flit across the interconnect 106 to the target 304. If the ReqCrd value reaches zero, the credit logic 126 causes the arbiter 404 to cease sending flits. At a memory device, which can be represented by the target 304, the link controller 314 processes the received flit. The arbiter 454 forwards a request 316 that was included in the flit to backend memory as a read or write memory request 354. The credit logic 124 increments the ReqCrd value (e.g., the quantity of the collection of credits 414) responsive to the forwarding of the memory request 354. The link controller 314 return the request credits (ReqCrd) accumulated at the credit logic 124 to the credit logic 126 with at least one response 318. This credit return 420 may be associated with a decrement of the ReqCrd at the credit logic 124 and an increment of the ReqCrd at the credit logic 126. While "credits" are described herein with reference to the CXL standard, the implementations of a memory-flow control register, as described in this document, can apply to and benefit other credit-based systems that operate in a similar manner.

Although credit-based flow control can be effective in throttling traffic between the initiator 302 and the target 304 (e.g., between a host and a memory device), it has a few characteristics that can adversely affect device and system performance. For example, as described above, when the host (e.g., the link controller 312) sends a request, credits are subtracted. But when the memory device (e.g., the link controller 314) unpacks or unpackages the request, or when the memory device forwards the request out of the request queue 452, the credit logic 124 returns a credit to the link controller 312. This return means the link controller 312 can send another request to the link controller 314. However, because of latency in the components "downstream" from the request queue 452 (e.g., backend interconnects, memory controllers, buffers, queues, and/or memory arrays), it is possible for the memory device or system to be oversubscribed at different locations downstream. This oversubscription can occur even though the credit-based flow control system indicates the host can transmit additional requests to the memory device.

This problem can be challenging to remedy because it may be difficult to account for all the latency in all the various components of the memory device, which components may be sourced from different vendors. In turn, the CXL device pin latency and other performance characteristics can be negatively affected if the host keeps transmitting requests. For example, the device may not perform at the level (e.g., the QoS) published by the manufacturer, even though the credit system is "properly" throttling traffic relative to the size of the request queue 452 and the speed at which the link controller 314 can empty the request queue 452. Details of a memory-flow control register are described next.

In some implementations, the target 304 (link controller 314) can also include the register 128. In other cases (not shown), another register or component, such as the credit logic 124, may include, or perform the functions of, the register 128. The host device 104 (e.g., the link controller 312) can read values stored in the register 128 (or the other register or component) via the interconnect 106, as described with reference to FIGS. 1-5. For clarity in FIG. 4, the connection between the register 128 and the host device 104 is omitted.

Figure 5:
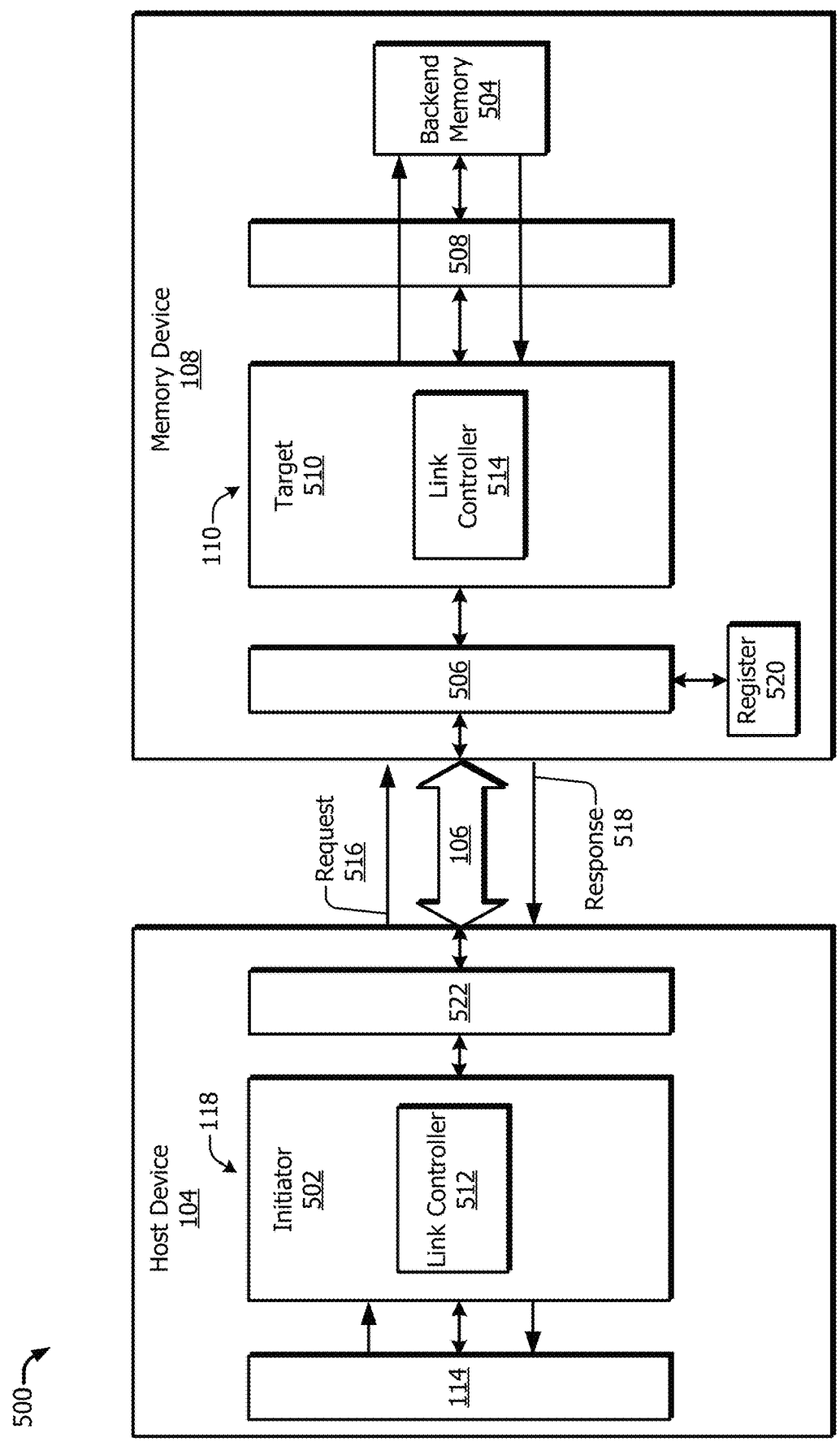
FIG. 5 illustrates examples of another computing system that can implement aspects of a memory-flow control register with a memory device.

FIG. 5 illustrates examples of another computing system 500 that can implement aspects of a memory-flow control register with a memory device. In some implementations, the computing system 500 includes at least one host device 104, at least one memory device 108, and at least one interconnect 106. The computing system 500 may form at least part of an apparatus 102 as shown in FIG. 1, a computing system 200 as shown in FIG. 2, or a system 300 as shown in FIG. 3.

The host device 104 can include a processor 114 and a controller 118. The controller 118 can be realized with at least one initiator 502. For example, the initiator 502 can be implemented or operated like the initiator 302. Thus, the initiator 502 can be coupled to the processor 114 or to the interconnect 106 (including to both), and the initiator 502 can be coupled between the processor 114 and the interconnect 106.

The memory device 108 can include, or be associated with, a backend memory 504. The backend memory 504 can include one or more memory components, (e.g., the memory 112, as described with reference to FIG. 1, or the DRAM 310 and one or more memory controllers, such as the MC 308, as described with reference to FIG. 3). The memory device 108 can also include at least one interface 506 and at least one controller 110. The controller 110 may be realized with at least one target 510. For example, the target 510 can be implemented or operated like the target 304. The target 510 can be coupled to the interconnect 106 via the interface 506. Thus, the memory device 108 (e.g., the target 510) and the host device 104 (e.g., the initiator 502) can be coupled to each other via the interconnect 106. The at least one controller 110 can also be communicatively coupled to the backend memory 504 via at least one interconnect 508 (e.g., the interconnect 508 can be implemented or operated like the interconnect 306, as described with reference to FIG. 3). The backend memory 504 and the controller 110 may be components that are integrated on a single semiconductor die or located on separate semiconductor dies (e.g., but still packaged together or coupled to or disposed on a same PCB). Each of the memory array 206 or the controller 110 may also be distributed across multiple dies.

The initiator 502 includes at least one link controller 512, and the target 510 includes at least one link controller 514. Either or both of the link controller 512 or the link controller 514 can instigate, coordinate, cause, or otherwise participate in or control signaling across a physical or logical link realized by the interconnect 106 in accordance with one or more protocols, including for example either or both of the PCIe protocol or the CXL protocol as described herein. The link controller 512 may be coupled to the interconnect 106. The link controller 514 may also be coupled to the interconnect 106. Thus, the link controller 512 can be coupled to the link controller 514 via the interconnect 106. Each link controller 512 or 514 may, for instance, control communications over the interconnect 106 at a link layer or at one or more other layers of a given protocol. Communication signaling may include, for example, a request 516, a response 518, and so forth.

The apparatuses and methods that are described herein may be appropriate for memory that is designed for use with a PCIe bus. Thus, the described principles may be incorporated into a memory device with a PCIe interface. Further, the memory device 108 can communicate over the interconnect 106 by overlaying a CXL protocol on the physical PCIe interface. An example of a memory standard that relates to CXL is promulgated by the Compute Express Link consortium and may include versions 1.0, 1.1, 2.0, and future versions. Thus, the interconnect 106 coupling the host device 104 and the memory device 108 may comport with at least one CXL standard. In other words, the memory device 108 may be a CXL device (e.g., a Type 1 CXL device, a Type 2 CXL device, or a Type 3 CXL device) or comport with the CXL standard. Accordingly, some terminology in this document may draw from one or more of these standards or versions thereof for clarity. The described principles, however, are also applicable to memories that comport with other standards, including earlier versions or future versions of such standards, and to memories that do not adhere to a public standard.

The memory device 108 can also include at least one register 520. The register 520 may be a hardware register, such as a read-only register or a read-write register. For example, the register 520 may be the register 128 as described with reference to FIG. 1. In some implementations in which the computing system 500 operates the CXL protocol and/or the PCIe protocol across the interconnect 106, the at least one register 520 can be located in or mapped to a CXL device configuration space (e.g., as described with reference to a standard, such as the CXL standard version 1.0, 1.1, 2.0, or a later version). As shown in FIG. 5, the register 520 may be separate from the controller 110. In some implementations (not shown), the register 520 may be integrated with the controller 110.

The register 520 can be coupled to the interconnect 106 via the interface 506. Thus, the register 520 can be read by other devices (e.g., the host device 104) via the interconnect 106. In some implementations, the register 520 can store one or more values indicative of a number of memory requests (e.g., write requests and read requests) that are serviceable by (e.g., can be outstanding) in the memory device (e.g., as described with reference to FIG. 1). In some implementations, a device manufacturer can store the values in the register 520 during assembly and configuration of the memory device 108. The device manufacturer can determine the values based on various factors. The factors can include a round-trip time for a request to be unpacked or unpackaged and forwarded from the memory-side controller until the memory response for that request is received at the memory-side controller or a pin-latency of the memory device (e.g., a round-trip time for a request-response pair from the interface 506). Other factors can include the time it takes memory requests to flow through the various interconnects, controllers, and queues inside the memory device, as described above (e.g., a propagation latency of the device), and a configuration of the backend memory 504. For example, the configuration of one or more DRAM and/or other memory components operating as the backend memory 504 (e.g., a Type 3 CXL device memory, such as a memory expander).

The values indicative of the number of memory requests that can be outstanding in the memory device 108 can be configured in a number of different ways. For example, the values can include at least one value indicative of a total combined number of write requests and read requests that can be outstanding. In other implementations, the stored values can include at least two values. Consider three examples. First, a value that is indicative of a number of write requests that can be outstanding, and another value that is indicative of the total combined number of write requests and read requests that can be outstanding. Second, a value that is indicative of a number of read requests that can be outstanding, and another value that is indicative of the total combined number of write requests and read requests that can be outstanding. Third, a value that is indicative of the number of write requests that can be outstanding, and another value that is indicative of the number of read requests that can be outstanding.

While the described examples can be used to indicate the total combined number of write requests and read requests that can be outstanding in the memory device 108, the examples that include the number of write requests that can be outstanding can enable other functionality. For example, some memory devices (e.g., a 3DXP device or other emergent memory types) may use read-modify-write operations, perform error-corrections of metadata transformations, and so forth. The values that enable control and limitation of the number of write requests may be beneficial in these scenarios. In some implementations, the examples that include the number of read requests that can be outstanding can also enable other functionality. For example, in applications or devices that may have larger read workloads, the values that enable control and limitation of the number of read requests may be similarly beneficial to reduce latency.

Further, the one or more registers 520 mapped to the CXL device configuration space can also be configured in a number of manners. For example, the register 520 can be a register that includes at least one value indicative of a total combined number of write requests and read requests that can be outstanding. In another example, the register 520 can be a register that includes at least one value indicative of a number of write requests that can be outstanding. In yet another example, the register 520 can be a register that includes at least one value indicative of a number of read requests that can be outstanding. In some implementations, the register 520 can include a combination of the preceding examples.

In other words, the register 520 may include a total request register (e.g., a CXL_Device_Max_Total_Request_Outstanding_Limit_REG) that indicates the total combined number of read and write requests that can be outstanding in the memory device, a read register that can separately indicate the number of read requests that can be outstanding in the memory device (e.g., a CXL_Device_Max_Read_Request_Outstanding_Limit_REG), a write register that can separately indicate the number of write requests that can be outstanding in the memory device (e.g., a CXL_Device_Max_Write_Request_Outstanding_Limit_REG), or a combination of those registers. The host device can then limit the amount of corresponding memory requests according to the values read from the registers. Depending on the configuration of the registers, the host can limit only the total combined number of requests (e.g., both read and write) or the total combined number and one or both of the read/write requests (e.g., the host can limit 1) the total number of requests and the number of read requests and/or 2) the total number of requests and the number of write requests), to maintain the performance of the system as advertised.

As depicted in FIG. 5, the host device 104 can include an interface 522. The initiator 502 can be coupled to the interconnect 106 via the interface 522. Thus, the host device 104 (e.g., the initiator 502) and the memory device 108 (e.g., the target 510) can be coupled to each other via the interconnect 106 and through the interface 522. The controller 118 (e.g., the initiator 502) can transmit a request to the memory device 108, via the interconnect 106, to read one or more values stored in the register 520 (e.g., a request 516). The one or more values can be indicative of a number of memory requests that can be outstanding in the memory device 108. The host device 104 can also receive a response from the memory device 108, via the interconnect 106, which can include the one or more values (e.g., a response 518). As described above, the values indicative of the number of memory requests that can be outstanding in the memory device can be configured in a number of different ways.

When the host device 104 receives the response from the register 520 (e.g., as part of the exchange of register-related information 130 of FIG. 1), which includes the values stored in the register 520, the host device 104 (e.g., the controller 118) can control a quantity of memory requests outstanding in the memory device 108 based on the values. As noted, the memory-flow control register can be used to address some of the inefficiencies associated with credit-based memory flow protocols in CXL devices, which are described above. For example, the controller 118 can control the quantity of memory requests outstanding in the memory device 108 to prevent the quantity of memory requests outstanding in the memory device 108 from exceeding the number of memory requests indicated by the one or more values. In some implementations, the controller 118 can control the quantity of memory requests outstanding in the memory device 108 during a period in which the controller 118 is operating under a credit-based flow control system that indicates credits are available to allow the controller 118 to transmit memory requests to the memory device 108, as described above.

In some implementations, the controller 118 can transmit via the interconnect 106 the request to the memory device to read one or more values stored in the register 520 during, or as a part of, an initialization operation. In some implementations, the initialization operation can be an initialization that is in response to the memory device 108 being powered up (e.g., being turned "on" from an "off" state or waking from a lower-power or "sleep" mode) or being connected to the controller 118 or a device associated with the controller, such as the host device 104 (e.g., a hot-plug or hot-swap operation). In other words, when either or both the host device 104 and/or the memory device 108 (or components thereof) is initialized, the controller 118 can read the values from the register 520. In some cases, this may be a process similar to reading other configuration registers upon initialization.

The controller 118 can control the quantity of memory requests outstanding in the memory device 108 using any of a variety of techniques. For example, the controller 118 can compare a quantity of memory requests outstanding in the memory device 108 to the number of memory requests that can be outstanding in the memory device 108 based on the one or more values. In some cases, the host device 104 (e.g., the controller 118) maintains a counter indicative of the quantity of outstanding requests. The counter is increased (e.g., incremented) responsive to transmission of a request 516. The counter is decreased (e.g., decremented) responsive to receipt of a response 518. The value of this counter can be compared to the value of the register 520 as received from the memory device 108. There can be multiple counters at the host device 104. For example, a counter for each type of communication described above with respect to the way the values can be communicated (e.g., a total number of combined read and write requests, a number of read requests along with the total number, the number of write requests along with the total number, or the number of read requests and the number of write requests).

In response to the quantity of memory requests outstanding in the memory device 108 being less than the number of memory requests that can be outstanding (e.g., based on the comparison), the controller 118 can transmit another memory request to the memory device 108. Conversely, in response to the quantity of memory requests outstanding in the memory device 108 being greater than or equal to the number of memory requests that can be outstanding (e.g., based on the comparison), the controller 118 can cease transmitting memory requests to the memory device 108, at least until this condition changes.

In a manner similar to that described herein for the memory device 108, the host device 104 can communicate over the interconnect 106 by overlaying a CXL protocol on a physical PCIe interface. Thus, the interconnect 106 coupling the host device 104 and the memory device 108 may comport with at least one CXL standard (e.g., CXL version 1.0, 1.1, 2.0, or another version). In other words, the initiator 502 of the host device 104 may be a CXL controller (e.g., a CXL link controller) or comport with the CXL standard.

The host device 104 can use the at least one register 520 to address the issues with credit-based flow control systems, as described above. For example, by using the described techniques and the register 520 to account for a mismatch between the credit-based request queue availability and the overall CXL pin latency, the memory device 108 and the example computing system can be configured to perform closer to the technical parameters and at the level (e.g., QoS) published by the manufacturer.

While the apparatuses and techniques for implementing a memory-flow control register are described generally with respect to CXL Type 3 devices (e.g., memory expanders), they can be extended to other types of CXL devices (e.g., Type 1 and Type 2 CXL devices), as well as non-CXL devices (e.g., a PCIe device).

Example Methods

Figure 6:
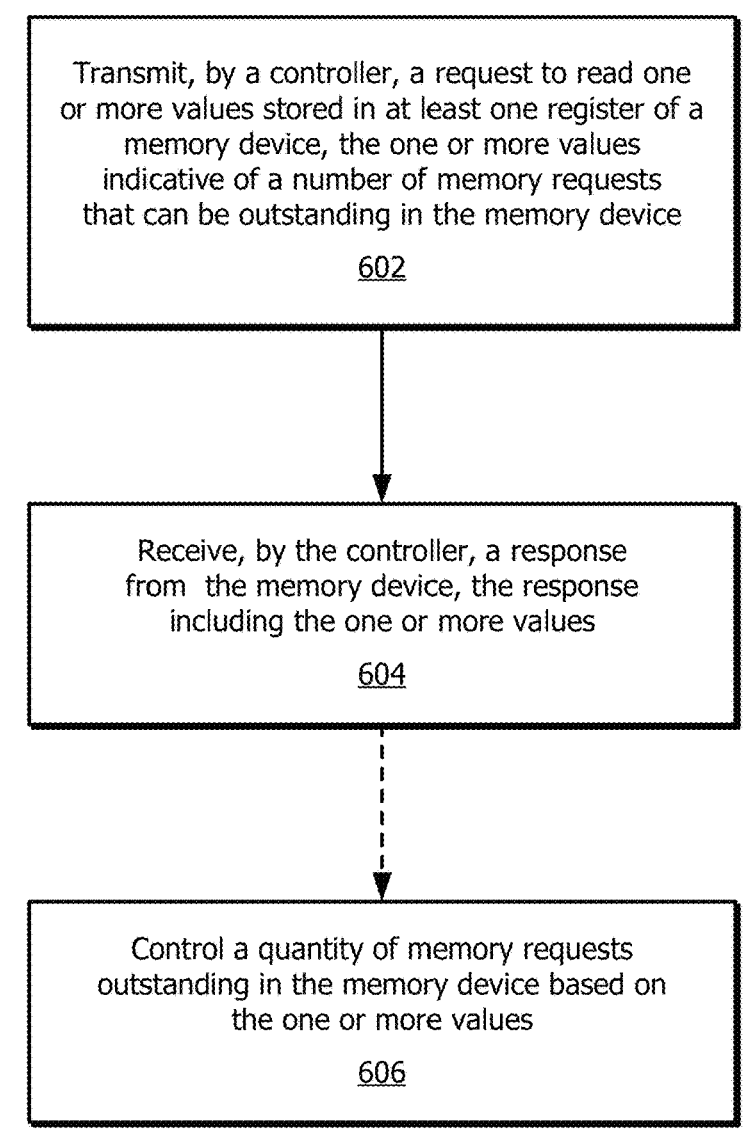
FIG. 6 illustrates a flow diagram for an example process that implements aspects of a memory-flow control register.
Figure 7:
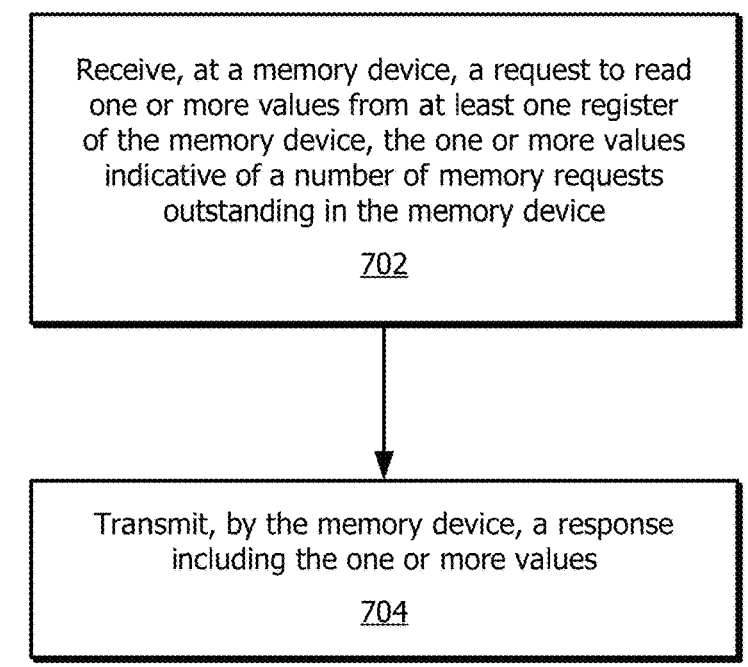
FIG. 7 illustrates a flow diagram for another example process that implements aspects of a memory-flow control register.

This section describes example methods with reference to the flow chart(s) and flow diagram(s) of FIGS. 6 and 7 for implementing a memory-flow control register. These descriptions may also refer to components, entities, and other aspects depicted in FIGS. 1-5, which reference is made only by way of example.

FIG. 6 illustrates a flow diagram for an example process 600 that implements aspects of a memory-flow control register. At block 602, a controller transmits a request to read one or more values stored in at least one register of a memory device. The one or more values can be indicative of a number of memory requests that are serviceable by the memory device (e.g., a number of memory requests that can be outstanding in or at the memory device or a number of memory requests that are authorized to be serviced by the memory device) as described, for example, with reference to FIG. 1. The total number of memory requests that are serviceable by the memory device may be a number of memory requests that the memory device can service a time in to provide a certain quality of service (QoS) or meet another specified technical or performance parameter. For example, the controller 118 (e.g., the initiator 502) of the host device 104 can transmit a request (e.g., a request 516) to the memory device 108, via the interconnect 106, to read one or more values stored in the register 520. The one or more values can be indicative of a number of memory requests that are serviceable by or can be outstanding in or at the memory device 108.

In some implementations, the host device 104 and the memory device 108 operate the CXL protocol and/or the PCIe protocol across the interconnect 106. In other words, the memory device 108 can be a CXL device (e.g., a Type 1, Type 2, or Type 3 CXL device), the initiator 502 (of the controller 118) can be a CXL link controller, and the register 520 can be located in or mapped to a CXL device configuration space (e.g., as described with reference to a standard, such as the CXL standard version 1.0, 1.1, 2.0, or a later version).

As described with reference to FIG. 5, the values indicative of the number of memory requests that can be outstanding in the memory device 108 can be configured in different ways. For example, the values can include at least one value indicative of a total combined number of write requests and read requests that can be outstanding. In other implementations, the stored values can include at least two values. Consider three examples. First, a value that is indicative of a number of write requests that can be outstanding, and another value that is indicative of the total combined number of write requests and read requests that can be outstanding. Second, a value that is indicative of a number of read requests that can be outstanding, and another value that is indicative of the total combined number of write requests and read requests that can be outstanding. Third, a value that is indicative of the number of write requests that can be outstanding, and another value that is indicative of the number of read requests that can be outstanding.

Similarly, the register 520 can also be configured in a number of manners. For example, the register 520 can be a register that includes at least one value indicative of a total combined number of write requests and read requests that can be outstanding. In another example, the register 520 can be a register that includes at least one value indicative of a number of write requests that can be outstanding. In yet another example, the register 520 can be a register that includes at least one value indicative of a number of read requests that can be outstanding. In some implementations, the register 520 can include a combination of the preceding examples.

At block 604, the controller receives a response from the memory device. The response can include the one or more values stored in the register. For instance, the host device 104 can receive a response from the memory device 108, via the interconnect 106, which can include the one or more values (e.g., a response 518) stored in the register 520.

Optionally, at block 606, the controller can control a quantity of memory requests outstanding in the memory device based on the one or more values. For example, the host device 104 (e.g., the controller 118) can control a quantity of memory requests outstanding in the memory device 108 based on the values received from the register 520 of the memory device 108. For instance, the controller 118 can control the quantity of memory requests outstanding in the memory device 108 to prevent the quantity of memory requests outstanding in the memory device 108 from exceeding the number of memory requests indicated by the one or more values. In some implementations, the controller 118 may be operating under a credit-based flow control system during a period in which the credit-based flow control system indicates credits are available to allow the controller to transmit memory requests to the memory device. During such a period, the controller 118 can control the quantity of memory requests outstanding in the memory device 108 to prevent the quantity of memory requests outstanding in the memory device 108 from exceeding the number of memory requests indicated by the one or more values, even though the credit-based flow control system indicates credits are available to allow the controller to transmit memory requests to the memory device. For instance, the controller 118 may refrain from transmitting a memory request to prevent the quantity of outstanding memory requests at the memory device 108 from exceeding the permitted number of memory requests at the memory device, as indicated by the one or more values, even if the controller 118 possesses a credit authorizing the transmission of another memory request.

The controller 118 can control the quantity of memory requests outstanding in the memory device 108 using any of a variety of techniques. For example, as described with reference to FIG. 5, the controller 118 can compare a quantity of memory requests outstanding in the memory device 108 to the number of memory requests that can be outstanding in the memory device 108, using the one or more values (e.g., in conjunction with one or more counters, as described above). In response to the quantity of memory requests outstanding in the memory device being less than the number of memory requests that can be outstanding in the memory device (e.g., based on the comparison), the controller 118 can continue transmitting memory requests to the memory device 108. Conversely, in response to the quantity of memory requests outstanding in the memory device 108 being greater than or equal to the number of memory requests that can be outstanding, the controller 118 can block or cease transmitting memory requests to the memory device 108.

In some implementations, as described with reference to FIG. 5, the controller 118 can transmit the request to the memory device, via the interconnect 106, to read one or more values stored in the register 520 during, or as a part of, an initialization operation. For example, the initialization operation can be an initialization that is in response to the memory device 108 being powered up (e.g., being turned "on" from an "off" state or waking from a lower-power or "sleep" mode) or being connected to the controller 118 or a device associated with the controller, such as the host device 104 (e.g., a hot-plug or hot-swap operation).

FIG. 7 illustrates a flow diagram for another example process 700 that implements aspects of a memory-flow control register. At block 702, a memory device receives a request to read one or more values from at least one register of the memory device, the one or more values indicative of a number of memory requests that are serviceable by the memory device (e.g., a number of memory requests that can be outstanding in or at the memory device or a number of memory requests that are authorized to be serviced by the memory device) as described, for example, with reference to FIG. 1. For example, the memory device 108 (e.g., the target 510) can receive a request (e.g., a request 516), via the interconnect 106, from the host device 104 (e.g., the initiator 502) requesting to read one or more values stored in the register 520. The one or more values can be indicative of a number of memory requests that are serviceable by or can be outstanding in the memory device 108.

At block 704, the memory device transmits a response, including the one or more values stored in the register. For example, the memory device 108 (e.g., the target 510) can transmit a response (e.g., a response 518), via the interconnect 106, to the host device 104 (e.g., the initiator 502). The response can include the one or more values stored in the register 520.

As described with reference to FIG. 5 and FIG. 6, the values indicative of the number of memory requests that can be outstanding in the memory device 108 can be configured in a number of different ways. For example, the values can include at least one value indicative of a total combined number of write requests and read requests that can be outstanding. In other implementations, the stored values can include at least two values. Consider three examples. First, a value that is indicative of a number of write requests that can be outstanding, and another value that is indicative of the total combined number of write requests and read requests that can be outstanding. Second, a value that is indicative of a number of read requests that can be outstanding, and another value that is indicative of the total combined number of write requests and read requests that can be outstanding. Third, a value that is indicative of the number of write requests that can be outstanding, and another value that is indicative of the number of read requests that can be outstanding.

Similarly, the register 520 can also be configured in a number of manners. For example, the register 520 can be a register that includes at least one value indicative of a total combined number of write requests and read requests that can be outstanding. In another example, the register 520 can be a register that includes at least one value indicative of a number of write requests that can be outstanding. In yet another example, the register 520 can be a register that includes at least one value indicative of a number of read requests that can be outstanding. In some implementations, the register 520 can include a combination of the preceding examples.

In some implementations, the host device 104 and the memory device 1018 operate the CXL protocol and/or the PCIe protocol across the interconnect 106. In other words, the memory device 108 can be a CXL device (e.g., a Type 1, Type, or Type 3 CXL device), the target 510 (controller 110) can be a CXL link controller, and the register 520 can be located in or mapped to a CXL device configuration space (e.g., as described with reference to a standard, such as the CXL standard version 1.0, 1.1, 2.0, or a later version).

For the flow chart(s) and flow diagram(s) described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 to 5, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations for memory-flow control register have been described in language specific to certain features and/or methods, the subject of the appended claims is not necessarily limited to the specific features or methods described. Rather, the specific features and methods are disclosed as example implementations for a memory-flow control register.

What is claimed is:

1. A method comprising:
   transmitting, by a controller, a request to read one or more values indicative of a number of memory requests serviceable by a Compute Express Link (CXL) memory device, the one or more values stored in at least one register mapped to a CXL device configuration space of the CXL memory device, the at least one register including one or more of:
   a first register that includes at least a first value indicative of a total combined number of write requests and read requests that can be outstanding in or at the CXL memory device;

a second register that includes at least a second value indicative of a number of write requests that can be outstanding in or at the CXL memory device; or a third register that includes at least a third value indicative of a number of read requests that can be outstanding in or at the CXL memory device; and receiving, by the controller, a response from the CXL memory device, the response including at least a portion of the one or more values.

2. The method of claim 1, further comprising:
controlling a quantity of memory requests outstanding in the CXL memory device based on the one or more values.

3. The method of claim 1, further comprising:
controlling a quantity of memory requests outstanding in the CXL memory device to prevent the quantity of memory requests outstanding in the CXL memory device from exceeding the number of memory requests indicated by the one or more values.

4. The method of claim 1, further comprising:
controlling a quantity of memory requests outstanding in the CXL memory device to prevent the quantity of memory requests outstanding in the CXL memory device from exceeding the number of memory requests indicated by the one or more values, during a period in which the controller is operating under a credit-based flow control system that indicates one or more credits are available to allow the controller to transmit memory requests to the CXL memory device.

5. The method of claim 1, further comprising:
comparing, by the controller, a quantity of memory requests outstanding in the CXL memory device to the number of memory requests serviceable by the CXL memory device using the one or more values; and
transmitting a memory request to the CXL memory device responsive to the quantity of memory requests outstanding in the CXL memory device being less than the number of memory requests serviceable by the CXL memory device.

6. The method of claim 1, further comprising:
comparing, by the controller, a quantity of memory requests outstanding in the CXL memory device to the number of memory requests serviceable by the CXL memory device using the one or more values; and
ceasing to transmit memory requests to the CXL memory device responsive to the quantity of memory requests outstanding in the CXL memory device being greater than or equal to the number of memory requests serviceable by the CXL memory device.

7. The method of claim 1, further comprising:
reading, by the controller, the one or more values stored in the at least one register of the CXL memory device during an initialization operation.

8. The method of claim 7, wherein the initialization operation is responsive to at least one of:
the CXL memory device powering up; or
the CXL memory device being connected to the controller or a device associated with the controller.

9. The method of claim 1, wherein the one or more values indicative of the number of memory requests serviceable by the CXL memory device comprise at least one of:
the first value;
the first value and the second value;
the first value and the third value; or
the second value and the third value.

10. The method of claim 1, wherein the CXL memory device comprises a Type 1 CXL device, a Type 2 CXL device, or a Type 3 CXL device.

11. The method of claim 1, wherein the controller comprises a CXL controller.

12. A method comprising:
receiving, at a Compute Express Link (CXL) memory device, a request to read one or more values indicative of a number of memory requests serviceable by the CXL memory device, the one or more values read from at least one register mapped to a CXL device configuration space of the CXL memory device, the at least one register including one or more of:
a first register that includes at least a first value indicative of a total combined number of write requests and read requests that can be outstanding in or at the CXL memory device;
a second register that includes at least a second value indicative of a number of write requests that can be outstanding in or at the CXL memory device; or
a third register that includes at least a third value indicative of a number of read requests that can be outstanding in or at the CXL memory device; and
transmitting, by the CXL memory device, a response including at least a portion of the one or more values.

13. The method of claim 12, wherein the one or more values indicative of the number of memory requests serviceable by the CXL memory device comprise at least one of:
the first value;
the first value and the second value;
the first value and the third value; or
the second value and the third value.

14. The method of claim 12, wherein the CXL memory device comprises a Type 1 CXL device, a Type 2 CXL device, or a Type 3 CXL device.

15. An apparatus comprising:
an interface configured to couple to a Compute Express Link (CXL) memory device via an interconnect; and
a controller coupled to the interface, the controller configured to:
transmit, via the interconnect, a request to the CXL memory device to read one or more values indicative of a number of memory requests serviceable by the CXL memory device, the one or more values stored in at least one register mapped to a CXL device configuration space of the CXL memory device, the at least one register including one or more of:
a first register that includes at least a first value indicative of a total combined number of write requests and read requests that can be outstanding in or at the CXL memory device;
a second register that includes at least a second value indicative of a number of write requests that can be outstanding in or at the CXL memory device; or
a third register that includes at least a third value indicative of a number of read requests that can be outstanding in or at the CXL memory device; and
receive, via the interconnect, a response from the CXL memory device, the response including at least a portion of the one or more values.

16. The apparatus of claim 15, wherein the controller is further configured to:
control a quantity of memory requests outstanding in the CXL memory device based on the one or more values.

17. The apparatus of claim 15, wherein the controller is further configured to:
control a quantity of memory requests outstanding in the CXL memory device to prevent the quantity of memory requests outstanding in the CXL memory device from exceeding the number of memory requests indicated by the one or more values.

18. The apparatus of claim 15, wherein the controller is further configured to:
control a quantity of memory requests outstanding in the CXL memory device to prevent the quantity of memory requests outstanding in the CXL memory device from exceeding the number of memory requests indicated by the one or more values, the control occurring during a period in which the controller is operating under a credit-based flow control system that indicates one or more credits are available to allow the controller to transmit memory requests to the CXL memory device.

19. The apparatus of claim 15, wherein the controller is further configured to:
compare a quantity of memory requests outstanding in the CXL memory device to the number of memory requests serviceable by the CXL memory device using the one or more values; and
transmit a memory request to the CXL memory device responsive to the quantity of memory requests outstanding in the CXL memory device being less than the number of memory requests serviceable by the CXL memory device.

20. The apparatus of claim 15, wherein the controller is further configured to:
compare a quantity of memory requests outstanding in the CXL memory device to the number of memory requests serviceable by the CXL memory device using the one or more values; and
cease to transmit memory requests to the CXL memory device responsive to the quantity of memory requests outstanding in the CXL memory device being greater than or equal to the number of memory requests serviceable by the CXL memory device.

21. The apparatus of claim 15, wherein the controller is further configured to:
transmit, via the interconnect, the request to the CXL memory device to read the one or more values stored in the at least one register of the CXL memory device during an initialization operation.

22. The apparatus of claim 21, wherein the initialization operation is responsive to at least one of:
the CXL memory device powering up; or
the CXL memory device being connected to the controller or a device associated with the controller.

23. The apparatus of claim 15, wherein the one or more values indicative of the number of memory requests serviceable by the CXL memory device comprise at least one of:
the first value;
the first value and the second value;
the first value and the third value; or
the second value and the third value.

24. The apparatus of claim 15, wherein the interconnect is configured to comport with at least one CXL standard.

25. The apparatus of claim 15, wherein the controller comprises a CXL controller.

26. An apparatus comprising:
an interface configured to couple to a host device via an interconnect; and
at least one register that is:
configured to:
be readable by the host device via the interconnect; and
store one or more values, the one or more values indicative of a number of memory requests serviceable by a Compute Express Link (CXL) memory device associated with the apparatus; and
mapped to a CXL device configuration space of the CXL memory device associated with the apparatus, the at least one register including one or more of:
a first register that includes at least a first value indicative of a total combined number of write requests and read requests that can be outstanding in or at the CXL memory device;
a second register that includes at least a second value indicative of a number of write requests that can be outstanding in or at the CXL memory device; or
a third register that includes at least a third value indicative of a number of read requests that can be outstanding in or at the CXL memory device.

27. The apparatus of claim 26, wherein the one or more values indicative of the number of memory requests serviceable by the CXL memory device comprise at least one of:
the first value;
the first value and the second value;
the first value and the third value; or
the second value and the third value.

28. The apparatus of claim 26, wherein the interconnect is configured to comport with at least one CXL standard.

29. The apparatus of claim 26, wherein the CXL memory device comprises a Type 1 CXL device, a Type 2 CXL device, or a Type 3 CXL device.

30. The apparatus of claim 26, wherein write and read memory requests that can be outstanding in or at the CXL memory device comprise one or more of:
write memory requests or read memory requests that are pending or extant in or at the CXL memory device;
write memory requests or read memory requests that have been received at the CXL memory device but not processed by the CXL memory device;
write memory requests or read memory requests that have been received by the CXL memory device but not yes responded to by the CXL memory device; or
write memory requests or read memory requests that are in-progress in downstream or backend components of the CXL memory device.

31. The method of claim 1, wherein write and read memory requests that can be outstanding in or at the CXL memory device comprise one or more of:
write memory requests or read memory requests that are pending or extant in or at the CXL memory device;
write memory requests or read memory requests that have been received at the CXL memory device but not processed by the CXL memory device;
write memory requests or read memory requests that have been received by the CXL memory device but not yes responded to by the CXL memory device; or
write memory requests or read memory requests that are in-progress in downstream or backend components of the CXL memory device.

32. The method of claim 1, wherein the at least one register mapped to the CXL device configuration space of the CXL memory device is:
separate from the controller; or
integrated with the controller.

33. The method of claim 12, wherein write and read memory requests that can be outstanding in or at the CXL memory device comprise one or more of:
- write memory requests or read memory requests that are pending or extant in or at the CXL memory device;
- write memory requests or read memory requests that have been received at the CXL memory device but not processed by the CXL memory device;
- write memory requests or read memory requests that have been received by the CXL memory device but not yes responded to by the CXL memory device; or
- write memory requests or read memory requests that are in-progress in downstream or backend components of the CXL memory device.

34. The apparatus of claim 15 wherein write and read memory requests that can be outstanding in or at the CXL memory device comprise one or more of:
- write memory requests or read memory requests that are pending or extant in or at the CXL memory device;
- write memory requests or read memory requests that have been received at the CXL memory device but not processed by the CXL memory device;
- write memory requests or read memory requests that have been received by the CXL memory device but not yes responded to by the CXL memory device; or
- write memory requests or read memory requests that are in-progress in downstream or backend components of the CXL memory device.

35. The apparatus of claim 15, wherein the at least one register mapped to the CXL device configuration space of the CXL memory device is:
- separate from the controller; or
- integrated with the controller.

36. The apparatus of claim 15, wherein the controller determines the number of memory requests that are serviceable by the CXL memory device based on a quantity of memory requests that are serviceable by the CXL memory device while providing a specified performance parameter defined by a quality of service (QoS) parameter.

* * * * *